(12) United States Patent
Hattori

(10) Patent No.: US 11,599,315 B2
(45) Date of Patent: Mar. 7, 2023

(54) PRINTING APPARATUS, PRINT PROCESSING SYSTEM, AND COMPUTER-READABLE MEDIUM TO PROVIDE SUPPLY-RELATED INFORMATION BASED ON SUPPLY-CONSUMED STATUS

(71) Applicant: Brother Kogyo Kabushiki Kaisha, Nagoya (JP)

(72) Inventor: Yuka Hattori, Mizuho (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/448,928

(22) Filed: Sep. 27, 2021

(65) Prior Publication Data

US 2022/0137897 A1    May 5, 2022

(30) Foreign Application Priority Data

Oct. 30, 2020    (JP) .............................. JP2020-182353

(51) Int. Cl.
G06F 3/12    (2006.01)
(52) U.S. Cl.
CPC .......... G06F 3/1229 (2013.01); G06F 3/1204 (2013.01)
(58) Field of Classification Search
None
See application file for complete search history.

(56) References Cited

U.S. PATENT DOCUMENTS

| | | | |
|---|---|---|---|
| 2005/0068351 A1* | 3/2005 | Katayama | B41J 2/17513 347/85 |
| 2006/0071952 A1* | 4/2006 | Motominami | B41J 3/46 347/5 |
| 2009/0086269 A1 | 4/2009 | Nakajima | |
| 2017/0090830 A1* | 3/2017 | Tomono | G06F 3/1219 |
| 2020/0225885 A1 | 7/2020 | Akimoto et al. | |

FOREIGN PATENT DOCUMENTS

| JP | 2009-086805 A | 4/2009 |
|---|---|---|
| JP | 2020-111023 A | 7/2020 |

* cited by examiner

*Primary Examiner* — Frantz Bataille
(74) *Attorney, Agent, or Firm* — Burr Patent Law, PLLC

(57) ABSTRACT

A printing apparatus includes a holder configured to hold an expendable supply attached thereto, a print engine configured to perform printing using the supply, a display configured to display information regarding the supply, and a controller configured to determine whether a supply-consumed status amount of the supply attached to the holder has reached a first threshold, the supply-consumed status amount representing how much the supply is consumed, and when determining that the supply-consumed status amount of the supply attached to the holder has reached the first threshold, cause the display to show supply-related information related to a contract concluded on the supply used for the printing.

17 Claims, 20 Drawing Sheets

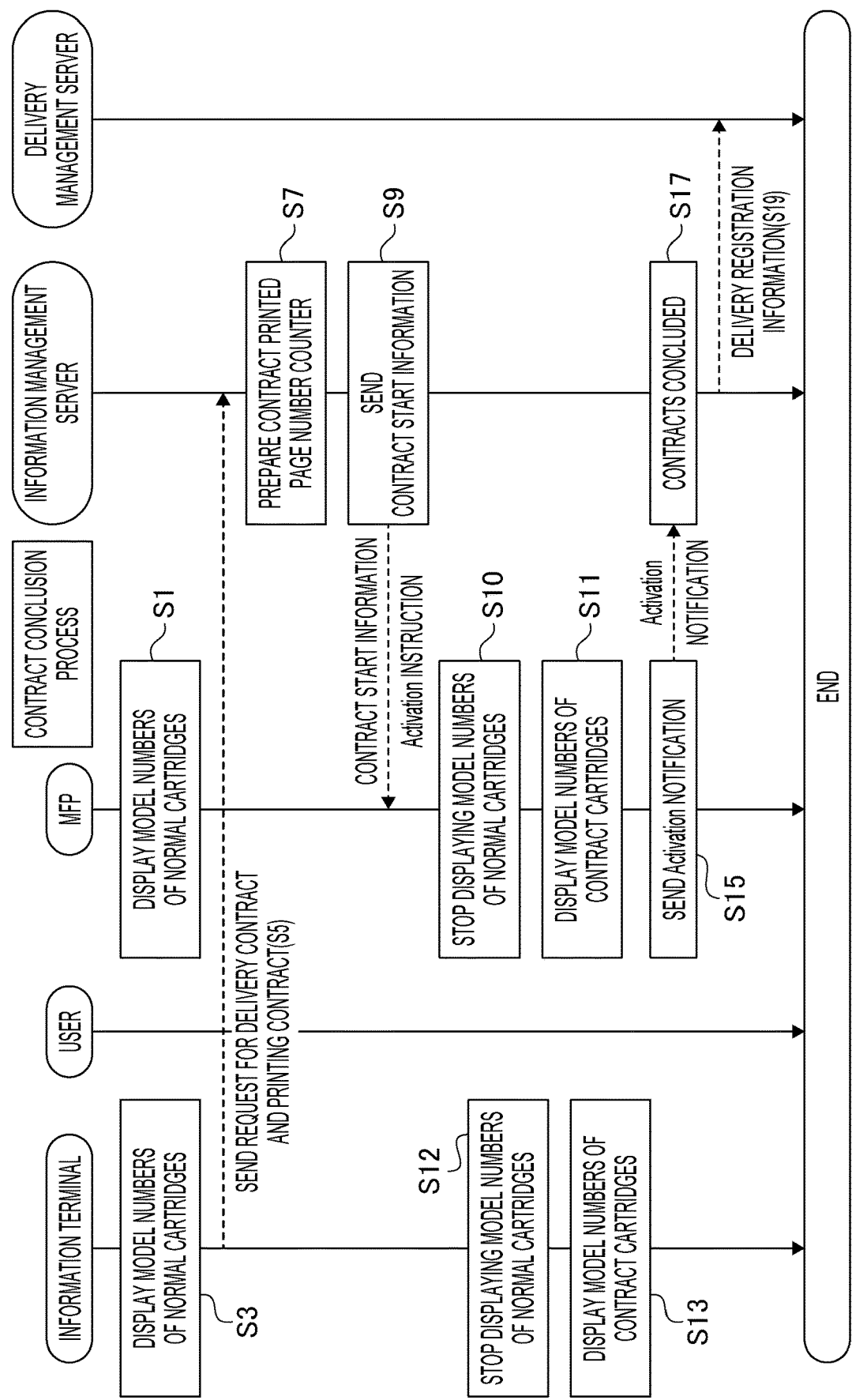

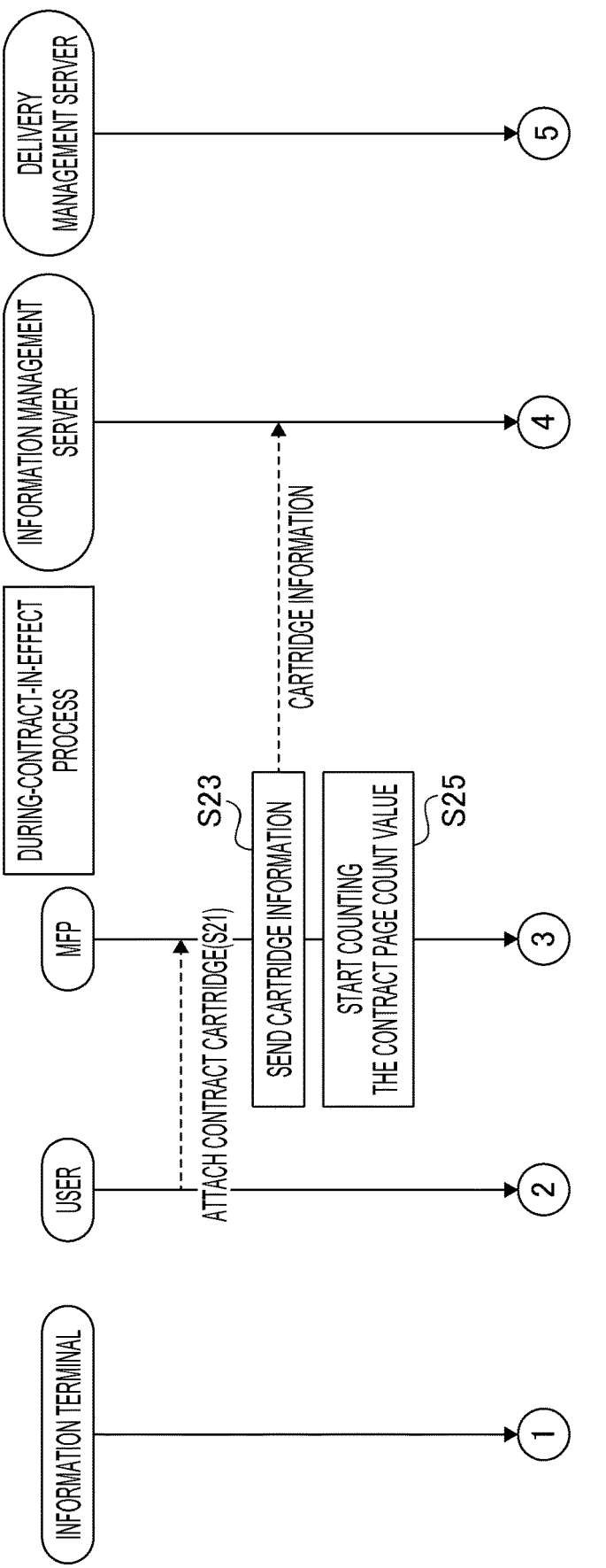

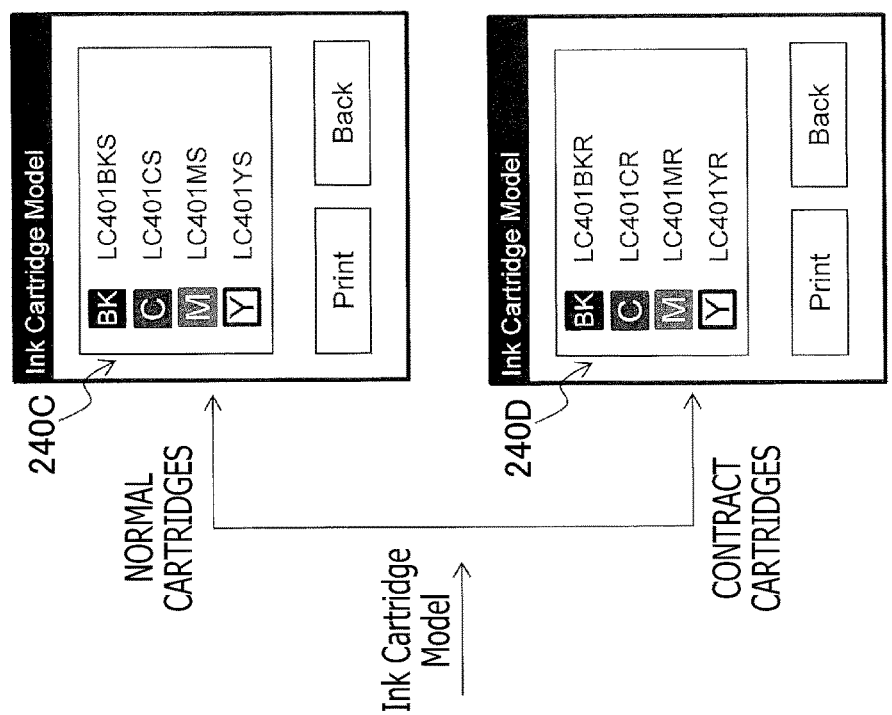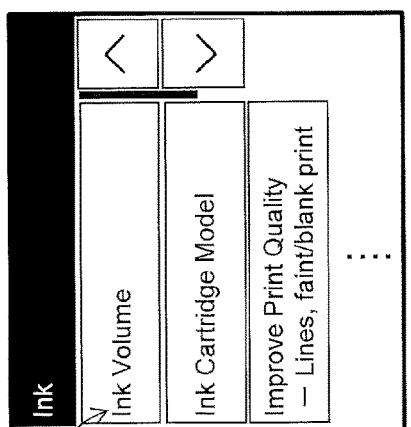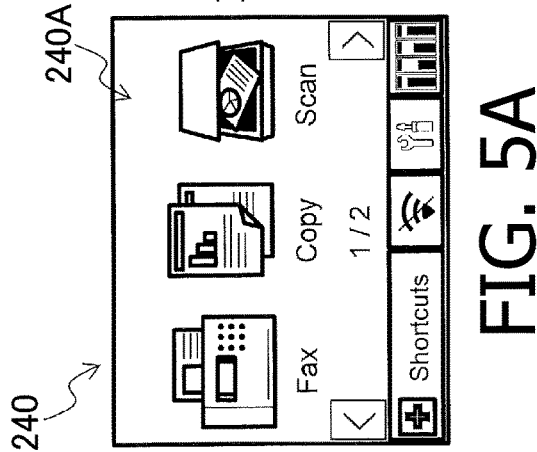

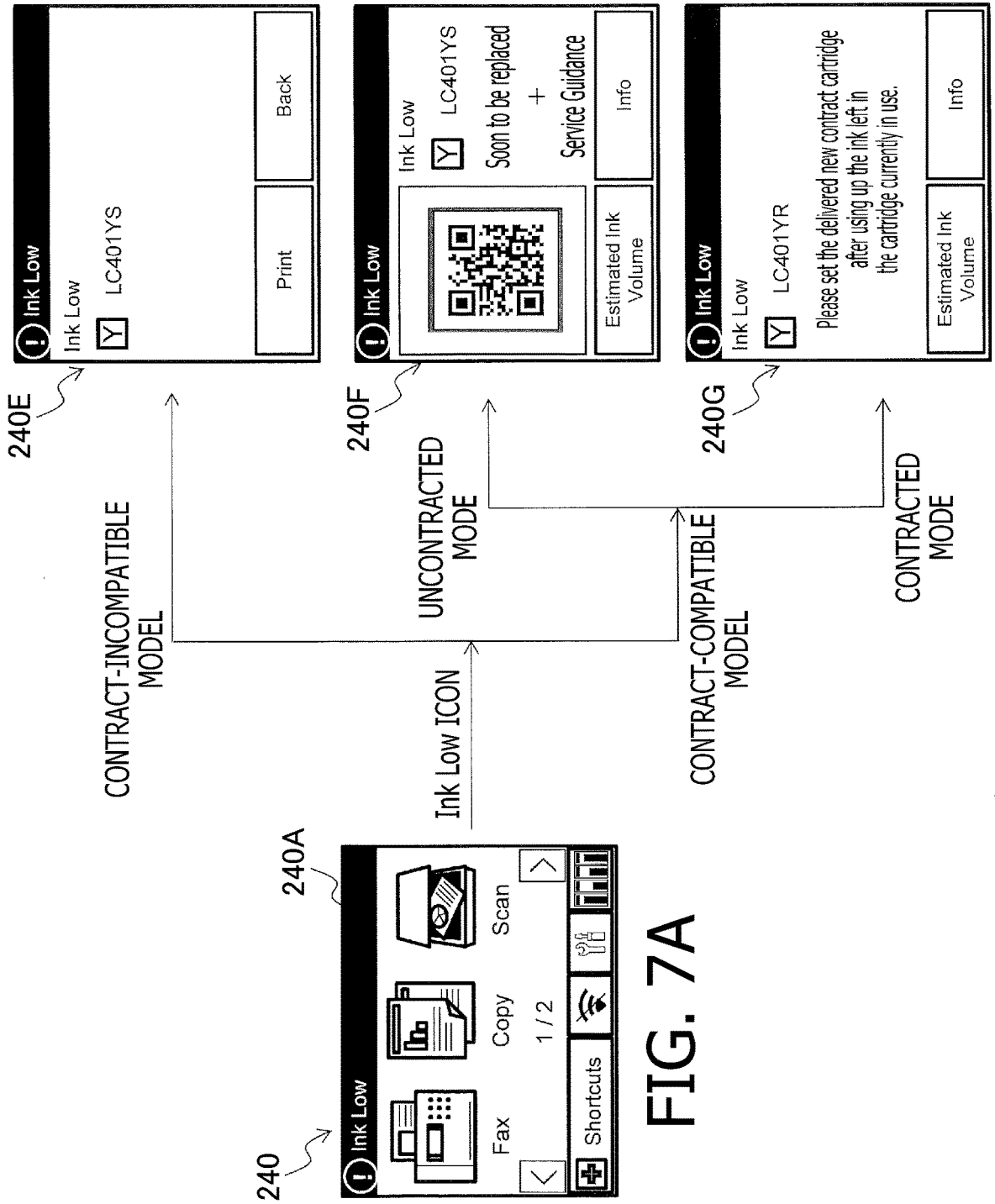

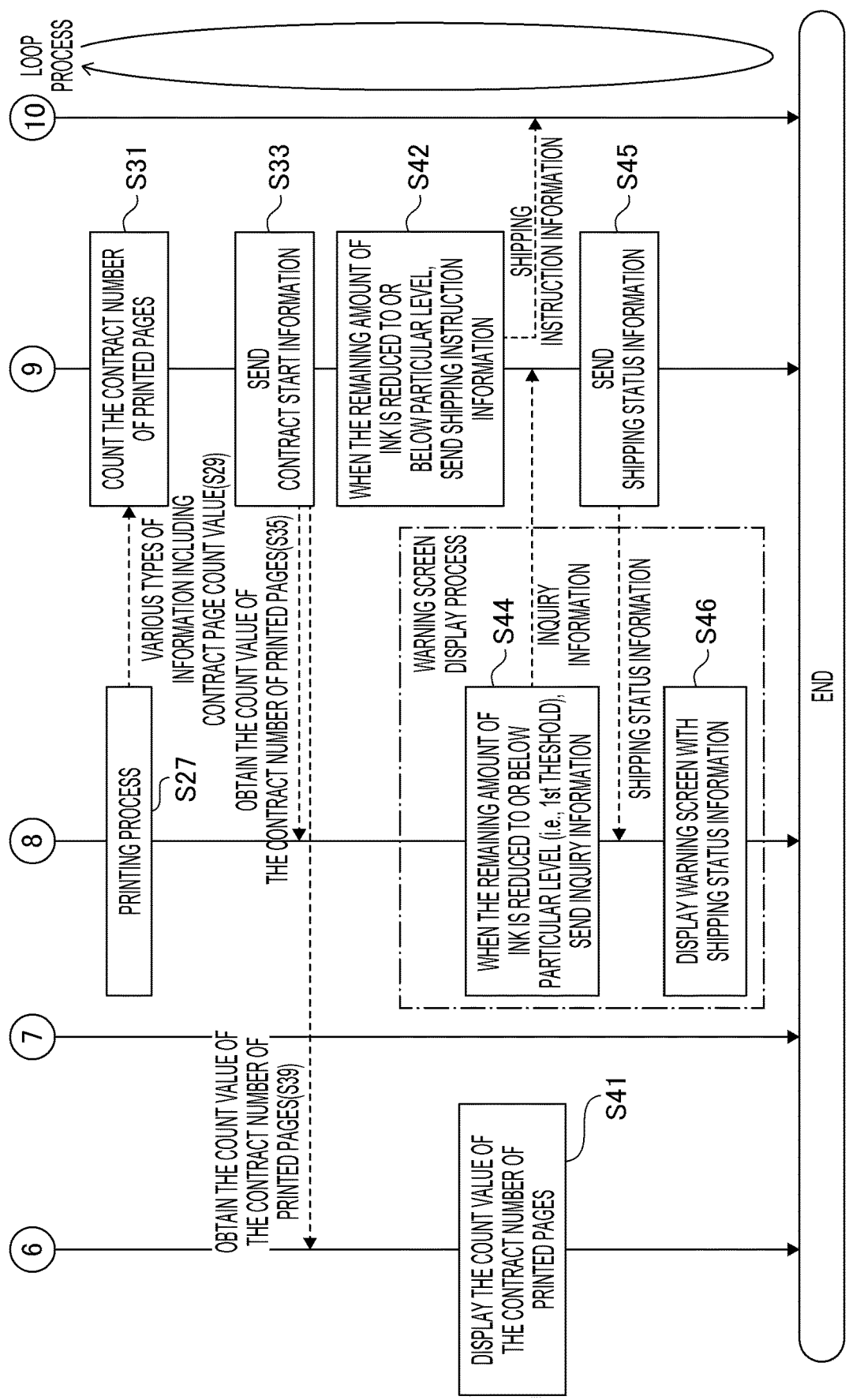

PRINTING APPARATUS, PRINT PROCESSING SYSTEM, AND COMPUTER-READABLE MEDIUM TO PROVIDE SUPPLY-RELATED INFORMATION BASED ON SUPPLY-CONSUMED STATUS

CROSS REFERENCE TO RELATED APPLICATIONS

This application claims priority under 35 U.S.C. § 119 from Japanese Patent Application No. 2020-182353 filed on Oct. 30, 2020. The entire subject matter of the application is incorporated herein by reference.

BACKGROUND

Heretofore, a technology has been known in which expendable supplies (e.g., cartridges used in a printer) are automatically ordered and delivered to a predetermined ordering destination in order to reduce time and effort for a user to purchase the supplies. Specifically, in the technology, the supplies are automatically ordered when a remaining quantity of the supplies (e.g., a remaining amount of printing agent in a cartridge currently in use) have become equal to or less than a particular threshold.

SUMMARY

In general, when a remaining quantity of supplies is reduced to or below a particular level, a printer provides a notification that the supplies will soon run out and need to be replaced. In this case, the printer may not only inform the user that a replacement time at which the supplies should be replaced is approaching, but also prompt the user who does not have stocks of the supplies to purchase new ones.

On the other hand, in order to receive services, as provided by the aforementioned known technology, to automatically order and deliver the supplies, it is usually required to conclude a delivery contract with a service provider. Therefore, it would be very convenient for users who want to receive the services if the users could be guided to conclude the delivery contract at a timing when the remaining quantity of the supplies is reduced to or below the particular level. However, if all the users, without any exception, are guided to conclude the delivery contract at the above timing, such a guide might provide unnecessary and troublesome information to some users who have already concluded the delivery contract. Rather, what is necessary for the users who have already concluded the delivery contract at the above timing is information as to whether new supplies for replacement have already been shipped and whether the new supplies shipped may be used by replacement for supplies currently in use immediately after arrival of the new supplies.

The aforementioned known technology does not take into account appropriate conveyance of the information that the users, who have already concluded the delivery contract, want to know.

Aspects of the present disclosure are advantageous to provide one or more improved techniques to appropriately provide information that a user, who has concluded a delivery contract, wants to know, based on a consumed status of supplies.

According to aspects of the present disclosure, a printing apparatus is provided, which includes a holder, a print engine, a display, and a controller. The holder is configured to hold an expendable supply attached thereto. The print engine is configured to perform printing using the supply. The display is configured to display information regarding the supply. The controller is configured to determine whether a supply-consumed status amount of the supply attached to the holder has reached a first threshold, the supply-consumed status amount representing how much the supply is consumed, and when determining that the supply-consumed status amount of the supply attached to the holder has reached the first threshold, cause the display to show supply-related information related to a contract concluded on the supply used for the printing.

According to aspects of the present disclosure, further provided is a printing system that includes a printing apparatus, and a server communicably connected with the printing apparatus. The printing apparatus includes a holder, a print engine, a display, and a controller. The holder is configured to hold an expendable supply attached thereto. The print engine is configured to perform printing using the supply. The display is configured to display information regarding the supply. The controller is configured to operate according to whether the printing apparatus is in an uncontracted mode in which a contract on the supply used for the printing has not been concluded or in a contracted mode in which the contract has been concluded, determine whether a supply-consumed status amount of the supply attached to the holder has reached a first threshold, the supply-consumed status amount representing how much the supply is consumed, and when determining that the supply-consumed status amount of the supply attached to the holder has reached the first threshold, perform, when the printing apparatus is in the uncontracted mode, causing the display to show contract-conclusion guidance information to prompt conclusion of the contract, and when the printing apparatus is in the contracted mode, causing the display to show supply-related information related to the contract concluded, and sending to the server an inquiry about a shipping status of a new supply for replacement of the supply attached to the holder. The server is configured to send, to the printing apparatus, a reply to the inquiry about the shipping status of the new supply. The controller of the printing apparatus is further configured to receive, from the server, the reply to the inquiry about the shipping status of the new supply, and cause the display to show shipping information regarding the shipping status of the new supply based on the received reply.

According to aspects of the present disclosure, further provided is a non-transitory computer-readable medium storing computer-readable instructions executable by a processor of a printing apparatus. The printing apparatus includes a holder, a print engine, and a display. The holder is configured to hold an expendable supply attached thereto. The print engine is configured to perform printing using the supply. The display is configured to display information regarding the supply. The instructions are configured to, when executed by the processor, cause the printing apparatus to operate according to whether the printing apparatus is in an uncontracted mode in which a contract on the supply used for the printing has not been concluded or in a contracted mode in which the contract has been concluded, determine whether a supply-consumed status amount of the supply attached to the holder has reached a first threshold, the supply-consumed status amount representing how much the supply is consumed, and when determining that the supply-consumed status amount of the supply attached to the holder has reached the first threshold, perform, when the printing apparatus is in the uncontracted mode, causing the display to show contract-conclusion guidance information to prompt conclusion of the contract, and when the printing apparatus is in the contracted mode, causing the display to show supply-related information related to the contract concluded.

BRIEF DESCRIPTION OF THE DRAWINGS

FIG. 2 is a sequence chart showing a procedure of a contract conclusion process to be performed by an information terminal, a multi-function peripheral (hereinafter referred to as an "MFP"), an information management server, and a delivery management server, according to one or more aspects of the present disclosure.

FIGS. 3A and 3B are a set of sequence charts showing a procedure of a during-contract-in-effect process to be performed by the information terminal, the MFP, the information management server, and the delivery management server, according to one or more aspects of the present disclosure.

FIGS. 5A to 5D illustrate an example in which model numbers of normal cartridges 4 are displayed on the MFP and an example in which model numbers of contract cartridges are displayed on the MFP, according to one or more aspects of the present disclosure.

FIGS. 7A to 7D illustrate a display transition of screens on the MFP from an initial screen to each warning screen, according to one or more aspects of the present disclosure.

FIGS. 12A and 12B are a set of sequence charts showing a procedure of a during-contract-in-effect process to display a shipping status of a new contract cartridge, according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
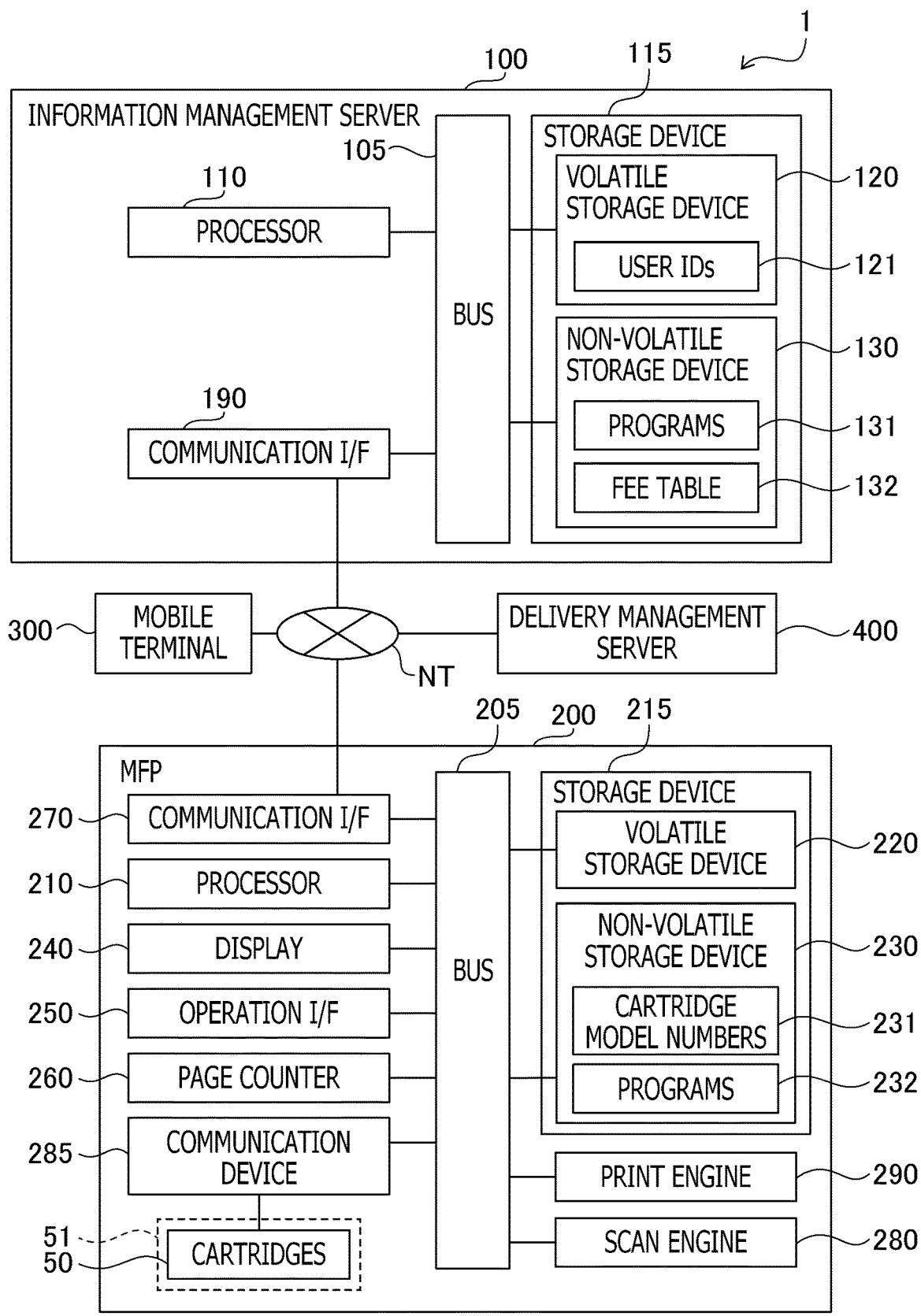
FIG. 1 is a block diagram schematically showing an overall configuration of a print processing system according to one or more aspects of the present disclosure.

FIG. 1 is a block diagram showing a configuration of a print processing system 1 in an illustrative embodiment according to aspects of the present disclosure. In the illustrative embodiment, the print processing system 1 is configured to provide a delivery service based on a delivery contract to automatically deliver expendable supplies for replacement when the expendable supplies used in an MFP ("MFP" is an abbreviation for "Multi-Function Peripheral") 200 are expended to a certain extent. The print processing system 1 is further configured to provide a printing service based on a printing contract to charge a fee according to the number of pages printed during a particular period of time.

<Overview of Print Processing System>

As shown in FIG. 1, the print processing system 1 includes an information management server 100, the MFP 200, a mobile terminal 300, and a delivery management server 400. The information management server 100, the MFP 200, the mobile terminal 300, and the delivery management server 400 are communicably interconnected via a network NT.

<Information Management Server>

The information management server 100 is installed and managed, for instance, by a manufacturer of the MFP 200. The information management server 100 includes a processor 110, a storage device 115, and a communication I/F ("I/F" is an abbreviation for "interface") 190. The processor 110, the storage device 115, and the communication I/F 190 are interconnected via a bus 105.

The storage device 115 includes a volatile storage device 120 and a non-volatile storage device 130. The volatile storage device 120 may include a DRAM. The volatile storage device 120 has a user ID storage area 121. The volatile storage device 120 stores a contract page count value received from the MFP 200. The non-volatile storage device 130 may include at least one of storage drives such as a hard disk drive and a solid-state drive. The non-volatile storage device 130 has a program storage area 131 and a fee table storage area 132.

The fee table storage area 132 stores particular correlations for calculating fees charged to the user in exchange for services such as printing and delivery of ink cartridges. In the correlations, for instance, fees charged per unit number of printed pages are set in association with printing service conditions such as coverage, a sheet size, and color/monochrome, and fees charged per unit number of ink cartridges are set in association with delivery service conditions such as a model number of the ink cartridges delivered.

The processor 110 is configured to perform data processing. For instance, the processor 110 may include a CPU. More specifically, the processor 110 is configured to, by executing programs stored in the program storage area 131, perform various processes as shown in FIGS. 2 to 4, 12, and 15. The various processes by the processor 110 may include data communication with the mobile terminal 300, the MFP 200, and the delivery management server 400 via the network NT.

The communication I/F 190 may include at least one of LAN interfaces such as a wired LAN I/F and a wireless LAN I/F. The communication I/F 190 is configured to perform communication with external devices via the network NT.

<Delivery Management Server>

The delivery management server 400 is installed, for instance, in a company that provides delivery services for various products including expendable supplies. The delivery management server 400 includes a processor (not shown), a storage device (not shown), and a communication I/F (not shown) connected with the network NT.

<MFP>

The MFP 200 is owned, for instance, by a business operator that provides the printing service. The MFP 200 may be privately owned by the user who uses it. The MFP 200 includes a scan engine 280, a print engine 290, a processor 210, a storage device 215, a display 240, an operation I/F 250, a page counter 260, a communication device 285, and a communication I/F 270. The scan engine 280, the print engine 290, the processor 210, the storage device 215, the display 240, the operation I/F 250, the page counter 260, the communication device 285, and the communication I/F 270 are interconnected via a bus 205.

The storage device 215 includes a volatile storage device 220 and a non-volatile storage device 230. The volatile storage device 220 may include a DRAM. The non-volatile storage device 230 may include a flash memory. The non-volatile storage device 230 has a cartridge model number storage area 231, a program storage area 232, and a contract storage area. The cartridge model number storage area 231 is for storing supply-related information related to contents of below-mentioned contracts concluded. The contract storage area is for storing the contents of the contracts that the user has concluded with a contractor. The program storage area 232 stores various programs that include control programs for controlling the MFP 200, such as a print processing program of the illustrative embodiment. The print processing program is for performing MFP-side processes in below-mentioned sequence flows as shown in FIGS. 2 to 4, 6, 10, 12, 13, 15, and 16. For instance, the print processing program may be previously stored in the program storage area 232 as firmware. In addition, information regarding printing operations based on the contents of the below-mentioned contracts is also stored as a part of the print processing program. The cartridge model number storage area 231 will be described later.

The processor 210 is configured to perform data processing. The processor 210 may include a CPU. The processor 210 executes the print processing program stored in the program storage area 232. Further, the processor 210 performs a printing method and a display method by the print processing system 1 of the illustrative embodiment, in cooperation with the processor 110.

The display 240 is, for instance, a liquid crystal display. The operation I/F 250 is configured to accept user operations. The user is allowed to input various instructions into the MFP 200 by operating the operation I/F 250. The communication I/F 270 may include at least one of LAN interfaces such as a wired network I/F and a wireless network I/F. The communication I/F 270 is configured to communicate with external devices via the network NT.

The scan engine 280 is configured to optically read a document using a photoelectric conversion element such as a CCD or a CMOS, thereby generating scanned data representing the read image.

The print engine 290 is configured to pick up and convey a sheet placed in a feed tray by a conveyance mechanism (not shown) and print an image on the sheet being conveyed, in a particular method. The following provides an explanation of an example in which the print engine 290 performs printing in an inkjet method. Namely, the print engine 290 performs image formation on the sheet using ink from ink cartridges 50, each of which is removably attached to a cartridge holder 51. More specifically, the MFP 200 includes the respective cartridges 50 for cyan ink, magenta ink, yellow ink, and black ink. However, for the sake of convenience, the respective ink cartridges 50 for the different four colors may be simply referred to as the "ink cartridges 50" without distinguishing each cartridge 50 from the other cartridges 50, unless otherwise specified.

The communication device 285 includes terminals. The communication device 285 is electrically connected with a cartridge memory (e.g., an IC chip) of each ink cartridge 50 attached to the cartridge holder 51. As described above, the MFP 200 of the illustrative embodiment is a model usable in the delivery service based on a particular delivery contract, and is also a model usable in the printing service based on a particular printing contract. Each of the ink cartridges 50 (hereinafter, which may be referred to as "contract cartridges 50") used based on such contracts has different specifications from, for instance, a normal ink cartridge 50 (hereinafter, which may be referred to as a "normal cartridge 50") that an owner of the MFP 200 personally purchases and uses. Therefore, each of the ink cartridges 50 has the cartridge memory (not shown), in which cartridge information is stored. The cartridge information contains cartridge type information indicating whether the corresponding ink cartridge 50 is a contract cartridge 50 or a normal cartridge 50. The processor 210 obtains the cartridge information from the cartridge memory of each ink cartridge 50 connected with the communication device 285. Thus, based on the obtained cartridge information, the processor 210 identifies whether each ink cartridge 50 attached to the cartridge holder 51 is a contract cartridge 50 or a normal cartridge 50.

At this time, in the MFP 200, in response to an operation accepted via the operation OF 250, the processor 210 may cause the display 240 to display identification information (e.g., in the illustrative embodiment, the model number) of an ink cartridge 50 that should be replaced due to a remaining amount of ink in the ink cartridge 50 being reduced to a particular level. Thereby, the user is allowed to easily recognize that there is an ink cartridge 50 to be replaced. The MFP 200 may be initially set, at the time of manufacture and shipment thereof, to cause the display 240 to display the model number of a corresponding normal cartridge 50 compatible with the MFP 200 in such a manner as to enable general users to easily identify the ink cartridge 50 to be replaced. Therefore, in the cartridge model number storage area 231, the model numbers of the normal cartridges 50 and the contract cartridges 50, which are usable in the MFP 200 and allow, when attached to the cartridge holder 51, the print engine 290 to perform image formation, are previously stored. The model numbers of the normal cartridges 50 and the contract cartridges 50 may be stored in the non-volatile storage device 130 of the information management server 100 or in a storage device of the below-mentioned mobile terminal 300, and may be read out and obtained by the MFP 200. A detailed explanation will be provided later of how and when the model numbers of those ink cartridges 50 are displayed on the display 240 in the illustrative embodiment.

The page counter 260 is configured to count up an accumulated number of pages printed each time the processor 210 controls the print engine 290 to perform printing. Specifically, for instance, the number of pages printed is counted as one page when simplex printing is performed for a single sheet (i.e., on a single side of the single sheet), and is counted as two pages when duplex printing is performed for the single sheet (i.e., on both sides of the single sheet). Further, a count value of the number of pages printed is initially set to zero, for instance, at the time of manufacture and shipment of the MFP 200, and thereafter, is counted up without exception each time printing is performed. The processor 210 may cause the page counter 260 to count up the number of pages printed and obtain the count value of the number of pages printed, thereby performing below-mentioned various processes.

<Mobile Terminal>

Examples of the mobile terminal 300 may include, but are not limited to, a smartphone owned by the user. The mobile terminal 300 is connected with the network NT via wireless communication. The mobile terminal 300 includes a processor, a storage device, a display, and a network OF (not shown) for connecting with the network NT. The storage device has a program storage area, in which various programs are stored. The various programs include processing programs for executing the below-mentioned sequence flows as shown in FIGS. 2 to 4, 12, and 15. Other information terminals, such as personal computers and tablet computers, may be used instead of the mobile terminal 300. Hereinafter, these information terminals may be collectively referred to simply as the "information terminal 300."

<Features of Illustrative Embodiment>

For instance, the print processing system 1 configured as above may be characterized in what is displayed on a warning screen when the remaining amount of ink in each ink cartridge 50 is reduced to or below a particular level.

Specifically, for instance, when the remaining amount of ink in an ink cartridge 50 is reduced to or below the particular level, the user may be notified by a warning screen that the ink cartridge 50 will soon need to be replaced. At this time, if users, who want to receive the delivery service but have not concluded yet the delivery contract, could be guided to conclude the delivery contract via the warning screen, it would be very convenient for the users. However, if all the users, without any exception, are guided to conclude the delivery contract via the warning screen, such a guide might provide unnecessary and troublesome information to some users who have already concluded the delivery contract. Rather, what is required to be displayed on the warning screen for the users who have already concluded the delivery contract is information related to contents of the concluded delivery contract, such as information as to whether new supplies shipped may be used by replacement for currently-used supplies immediately after arrival of the new supplies. Thus, it is demanded to switch the displayed contents on the warning screen depending on whether individual users have concluded the delivery contract.

<Processing Flows>

Figure 3B:
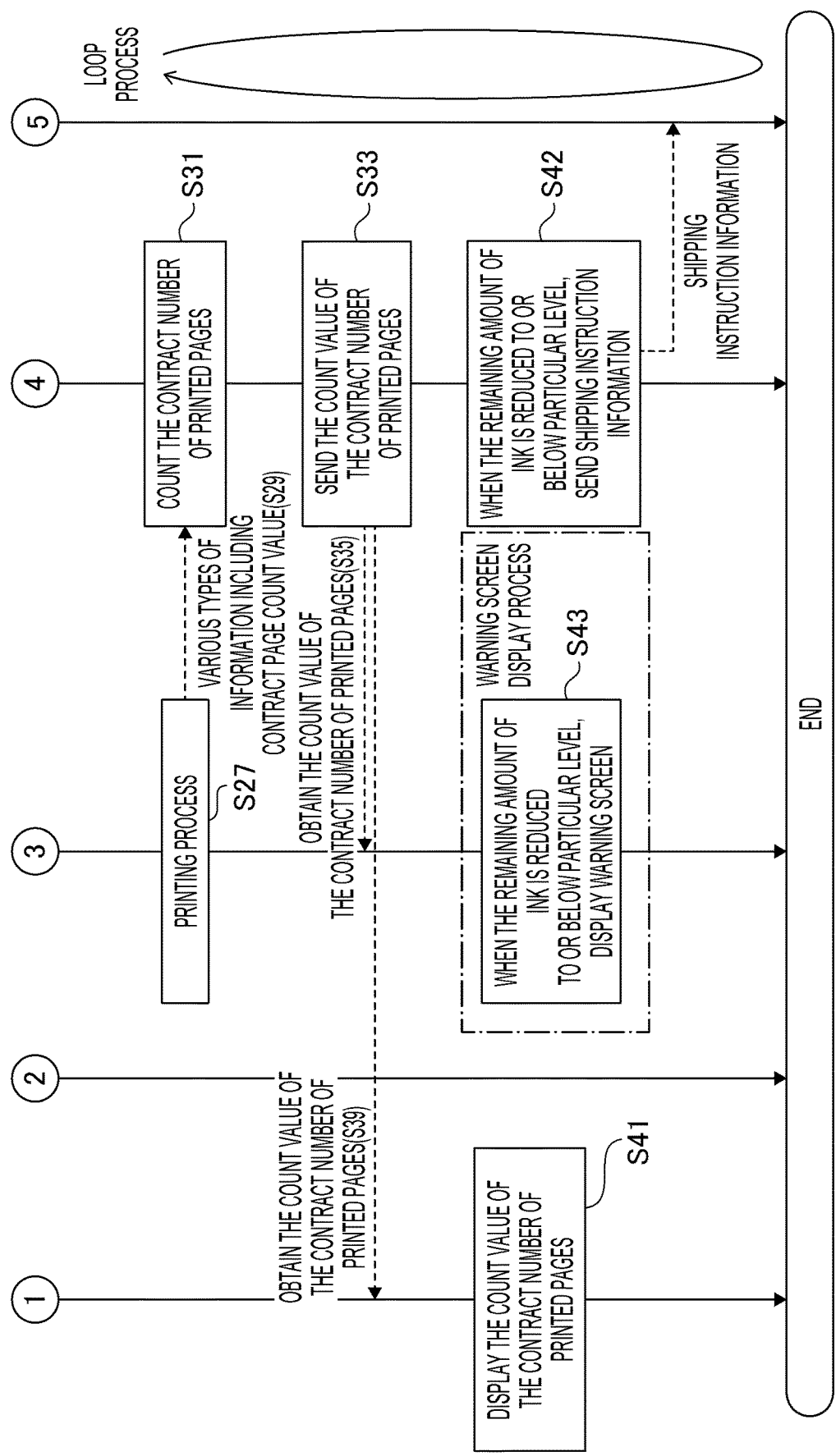
Figure 4:
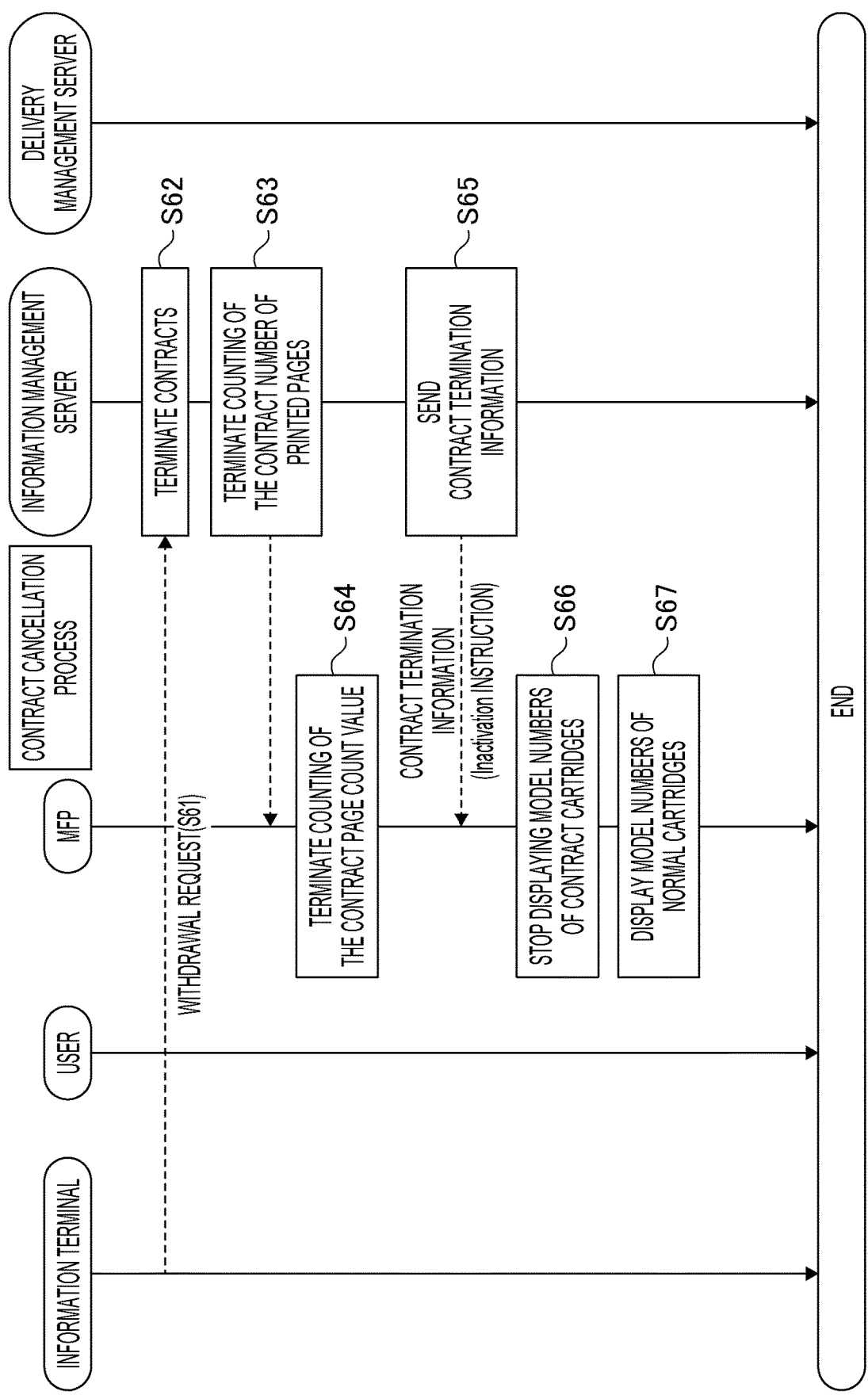
FIG. 4 is a sequence chart showing a procedure of a contract cancellation process to be performed by the information terminal, the MFP, the information management server, and the delivery management server, according to one or more aspects of the present disclosure.

Referring to sequence charts shown in FIGS. 2 to 4, explanations will be provided of control procedures of processes that are performed, in order to meet the aforementioned demand, by the processor 210 of the MFP 200, the processor 110 of the information management server 100, the processor of the delivery management server 400, and the processor of the information terminal 300 in the illustrative embodiment. Further, a warning screen display process to be performed by the processor 210 of the MFP 200 will be described with reference to FIG. 6. FIG. 2 is a sequence chart showing a procedure of a contract conclusion process to conclude the delivery contract and the printing contract. FIGS. 3A and 3B are a set of sequence charts showing a procedure of a during-contract-in-effect process while the delivery contract and the printing contract are in effect. FIG. 4 is a sequence chart showing a procedure of a contract cancellation process to cancel the delivery contract and the printing contract. In the following descriptions, these processes will be explained by referring to the relevant drawings in order from FIG. 2. Further, in the following descriptions with reference to FIGS. 2 to 4, referring to each of the processors may be omitted. For instance, "in the processor 210 of the MFP 200" may be simply expressed as "in the MFP 200," and "by the processor 210 of the MFP 200" may be simply expressed as "by the MFP 200."

In the contract conclusion process shown in FIG. 2, first, when the user performs an appropriate operation via the operation I/F 250, the MFP 200 causes the display 240 to display model numbers of the normal cartridges 50 compatible with the MFP 200, based on information stored in the cartridge model number storage area 231 (S1). At this point of time, a below-mentioned printing contract has not been concluded, and the normal cartridges 50 are attached to the cartridge holder 51, or no cartridges 50 are attached thereto. An example of what is displayed on the display 240 at this time will be described with reference to FIGS. 5A to 5D.

<Display Example of Model Numbers of Normal Cartridges on MFP>

In examples shown in FIGS. 5A to 5D, the display 240 is configured as a touch panel, which also serves as the operation I/F 250. Hereinafter, the display 240 may be referred to as the "touch panel 240." As shown in FIG. 5A, on an initial screen 240A displayed on the touch panel 240, icons are displayed that represent options such as "Fax," "Copy," and "Scan" in an operation menu. When the user operates an "Ink" icon among the icons in the operation menu, a setting screen 240B (see FIG. 5B) for various settings is displayed.

The setting screen 240B for various settings includes buttons such as "Ink Volume," "Ink Cartridge Model," and "Improve Print Quality" displayed as buttons representing settable items. When the user, who has not yet concluded the printing contract, operates the "Ink Cartridge Model" button among the buttons displayed on the setting screen 240 for various settings, a model number display screen 240C (see FIG. 5C) for the printing contract not concluded is displayed.

The model number display screen 240C for the printing contract not concluded displays thereon an item "Ink Cartridge Model" and the model numbers of the normal cartridges 50 compatible with the MFP 200. In the illustrative embodiment, a model number of a corresponding normal cartridge 50 for each ink color is displayed on the model number display screen 240C for the printing contract not concluded. Specifically, for instance, model numbers of "LC401BKS" for black ink, "LC401CS" for cyan ink, "LC401MS" for magenta ink, and "LC401YS" for yellow ink are displayed, as shown in FIG. 5C. In the example shown in FIG. 5C, "S" added at the end of the model number of the cartridge 50 for each ink color is a symbol indicating the normal cartridge 50. In a lower section of the model number display screen 240C, a "Print" button and a "Back" button are displayed as well. When the user operates the "Print" button, the processor 210 controls the print engine 290 to print, on a sheet, displayed contents of the model numbers of the normal cartridges 50 on the model number display screen 240C (a printed result in this case is not shown in particular). When the user operates the "Back" button, the processor 210 brings the screen displayed on the display 240 back to the setting screen 240B (see FIG. 5B) for various settings. A model number display screen 240D shown in FIG. 5D will be described later.

<Display of Model Numbers of Normal Cartridges on Information Terminal>

Referring back to FIG. 2, when the user performs an appropriate operation via the operation I/F 250, in conjunction with the process executed in S1, the information terminal 300 receives, from the MFP 200, the same model number as displayed in S1 for each of the black ink, the cyan ink, the magenta ink, and the yellow inks, and displays the received model numbers on the display of the information terminal 300 (S3).

In S3, on the information terminal 300, the model numbers are displayed, for instance, in such a file format that display data is incorporated in a web page accessible at a specified URL, i.e., in a so-called EWS ("EWS" is an abbreviation for "Embedded Web Server") file format. Namely, in S3, the display data in the EWS file format is output from the MFP 200 to a browser of the information terminal 300, when the specified URL is accessed by an appropriate user operation in the information terminal 300. As a result, the browser of the information terminal 300 displays the web page in which information containing the model numbers of the normal cartridges 50 is described.

The method to display the model numbers of the normal cartridges 50 on the information terminal 300 is not limited to the aforementioned method to display them on the web page in the EWS file format. For instance, based on user-specific information previously stored for each user in the information management server 100, a My Page for each user may be accessed from the information terminal 300, and thereby, be displayed on the information terminal. In this case, substantially the same information as displayed on the aforementioned web page may be displayed on the My Page for each user (illustration of a specific example in the case is omitted).

<Conclusion of Delivery Contract and Printing Contract>

Referring back to FIG. 2, after S1 and S3, when the user performs an appropriate operation on the information terminal 300 with an intention of using the MFP 200 based on the delivery contract and the printing contract, a request for the delivery contract and the printing contract is sent by the information terminal 300 to the information management server 100, and is received by the information management server 100 (S5).

In response to receipt of the request for the delivery contract and the printing contract in S5, the information management server 100 prepares a contract printed page number counter function based on the page count value by the page counter 260 (S7). The contract printed page number counter function is a function to count only the number of pages printed properly according to the below-mentioned printing contract among the number of pages counted by the page counter 260 during a specific period of time after the printing contract has been concluded. In the illustrative embodiment, the specific period of time is "one month," and the number of pages printed per month (hereinafter, which may be simply referred to as the "contract number of printed pages") is counted as an example of the number of pages printed during the specific period of time. The contract printed page number counter function is provided in the information management server 100 in association with a user ID corresponding to the information terminal 300.

Thereafter, contract start information, i.e., an Activation instruction is sent by the information management server 100 and received by the MFP 200 (S9). Thereby, the delivery contract and the printing contract are concluded. Based on the receipt of the Activation instruction, the MFP 200 writes, into the contract storage area, that the MFP 200 has been brought into a contract start state, for instance, by storing a specific flag in the contract storage area. When Activation is performed, the MFP 200 is allowed to perform a printing operation based on the contents of the below-mentioned contracts concluded. The processor 210 of the MFP 200 may perform, as an "operation based on the contents of the contracts concluded," an operation of accessing the supply-related information stored in the storage device 215 according to whether the specific flag is stored and displaying the supply-related information on the display 240. In another instance, the original contents of the contracts concluded with the contractor may be stored as information corresponding to the "contents of the contract concluded."

<Display of Model Numbers of Contract Cartridges on MFP>

Thereafter, in response to the printing contract being concluded, the processor 210 of the MFP 200 controls the display 240 to stop displaying the model numbers of the normal cartridges 50 which began to be displayed in S1. Namely, the model numbers of the normal cartridges 50 are not displayed (S10). Then, based on the contents stored in the cartridge model number storage area 231, the processor 210 controls the display (i.e., the touch panel) 240 to newly display model numbers of the contract cartridges 50 compatible with the MFP 200 (S11).

<Display Example of Model Numbers of Contract Cartridges on MFP>

For instance, a specific procedure of the process in S11 may be as follows. A flow of displaying the model numbers of the contract cartridges 50 on the touch panel 240 of the MFP 200 will be described with reference to FIGS. 5A, 5B, and 5D. As shown in FIGS. 5A, 5B, and 5D, if the printing contract has already been concluded after the user operates the "Ink" icon on the initial screen 240A and then operates the "Ink Cartridge Model" button on the setting screens 240B for various settings, the model number display screen 240D (see FIG. 5D) for the printing contract concluded is displayed. At this time, unlike the model number display screen 240C (see FIG. 5C), the model numbers of the contract cartridges 50 compatible with the MFP 200 are displayed on the model number display screen 240D. In the illustrative embodiment, the model number of the corresponding contract cartridge 50 for each ink color is displayed. Specifically, for instance, model numbers of "LC401BKR" for black ink, "LC401CR" for cyan ink, "LC401MR" for magenta ink, and "LC401YR" for yellow ink are displayed. In the example shown in FIG. 5D, "R" added at the end of the model number of the cartridge 50 for each ink color is a symbol indicating the contract cartridge 50.

<Display of Model Numbers of Contract Cartridge on Information Terminal>

Referring back to FIG. 2, the information terminal 300 stops displaying the model numbers of the normal cartridges 50 which began to be displayed in S3, in conjunction with the process of S10 in response to the printing contract being concluded. Namely, the model numbers of the normal cartridges 50 are not displayed (S12). Then, in substantially the same manner as in S11, the model numbers of the contract cartridges 50 compatible with the MFP 200 are newly displayed (S13).

Thereafter, a contract acknowledgement notification, i.e., an Activation notification is sent by the MFP 200 (S15) and received by the information management server 100 (S17). In S15, for instance, the MFP 200 may send the Activation notification in response to an inquiry from the information management server 100. Thereby, the information management server 100 recognizes that the printing contract has been concluded. Afterward, the MFP 200 periodically communicates with the information management server 100 to exchange information regarding the printing contract. In the illustrative embodiment, the MFP 200 performs regular communication every 12 hours to exchange the information regarding the printing contract, and the information management server 100 manages information necessary for services based on the printing contract. After that, the information management server 100 sends delivery registration information for delivering the contract cartridges 50 to the user, to the delivery management server 400 (S19). Thereby, registration arrangements for delivering the contract cartridges 50 from a delivery service company to the user are completed.

Next, the procedure of the during-contract-in-effect process while the delivery contract and the printing contract are in effect will be described with reference to FIGS. 3A and 3B. In the process shown in FIGS. 3A and 3B, in S21, when the user attaches a contract cartridge 50 delivered as described above to the cartridge holder 51 of the MFP 200 while confirming the model numbers of the contract cartridges 50 displayed on the touch panel 240 in S11, the communication device 285 obtains the cartridge information for each ink. The obtained cartridge information is sent by the MFP 200 and received by the information management server 100 (S23).

Thereafter, the MFP 200 starts counting by a contract counter function, based on the page count value by the page counter 260 (S25). The contract counter function is a function to count only the number of pages printed properly according to the printing contract, among the number of pages counted by the page counter 260 after the printing contract has been concluded. Therefore, the contract counter function does not count the number of pages printed, for instance, in cases such as where so-called test printing was performed, where one side of each page was printed even though the printing contract was for duplex printing, and where a printing failure occurred for a reason such as a sheet conveyance trouble at the MFP 200 side. Hereinafter, the number of printed pages counted by the contract counter function may be referred to as the "contract page count value."

When performing a printing process by the print engine 290 (S27) and counting up the number of printed pages by the page counter 260, the MFP 200 counts up, by the contract counter function, the contract page count value in response to printing being properly performed according to the printing contract. The MFP 200 sends various types of information including the contract page count value to the information management server 100 (S29).

The information management server 100 counts, by the contract printed page number counter function prepared in S7, the contract number of printed pages based on the contract page count value received from the MFP 200 (S31). The counting of the contract number of printed pages will be described in detail below. As described earlier, the information management server 100 performs the regular communication to exchange information with the MFP 200 every 12 hours. The information management server 100 stores, in the volatile storage device 120, the contract page count value received from the MFP 200 through the regular communication. Here, the information management server 100 updates the count value of the contract number of printed pages for each specific period of time, i.e., every month. In other words, the contract number of printed pages is reset to zero every month. The information management server 100 compares the contract page count value received from the MFP 200 through the regular communication after the above resetting with the contract page count value received from the MFP 200 before the resetting, and stores a difference resulting from the comparison as the contract number of printed pages. The information management server 100 repeatedly performs this process until the end of the specified period of time (i.e., one month). Thereby, the user is allowed to know the latest contract number of printed pages that is updated every 12 hours as a cycle of the regular communication. Namely, the contract number of printed pages is the number of pages printed in that one month. In the illustrative embodiment, the specific period is set to one month in order to display the number of paged printed per month for a monthly charge. However, the specific period of time may be set to two months or one week. The specific period of time may be changed as needed in consistency with the form of each service. Further, in the illustrative embodiment, the contract number of printed pages is updated every 12 hours as a cycle of the regular communication. However, for instance, the information management server 100 may perform the regular communication with the MFP 200 every other day. In another instance, the information management server 100 may perform communication with the MFP 200 irregularly (e.g., at each timing after printing) to update the contract number of printed pages.

Thereafter, the information management server 100 sends, to the MFP 200, the count value of the contract number of printed pages as counted in S31 (S33). The MFP 200 receives and obtains the sent count value of the contract number of printed pages (S35). In S33, the information management server 100 also sends the count value of the contract number of printed pages as counted in S31 to the information terminal 300. The information terminal 300 receives and obtains the sent count value of the contract number of printed pages (S39). The information terminal 300 displays the obtained count value of the contract number of printed pages (S41).

While the printing process of S27 is being performed using the contract cartridges 50 based on the printing contract, the MFP 200 detects the remaining amount of ink that is left after consumed in the contract cartridges 50 in a known method. At this time, if the remaining amount of ink in a contract cartridge 50 is reduced to or below a particular level (e.g., a below-mentioned first threshold) at the timing of the aforementioned regular communication, the MFP 200 sends the status of the decrease in the remaining amount of ink to the information management server 100. Hereinafter, the status of the decrease in the remaining amount of ink may be simply referred to as the "remaining-ink-reduced status." The information management server 100 receives the sent status and grasps the decrease in the remaining amount of ink. In response to receiving the remaining-ink-reduced status, the information management server 100 sends, to the delivery management server 400, shipping instruction information for delivering an additional contract cartridge 50 to the user (S42). In this regard, the information management server 100 may transmit the shipping instruction information not only when the information management server 100 grasps the remaining-ink-reduced status directly from the MFP 200 as described above, but also based on comprehensive determination such as receiving the remaining amount of ink through each regular communication and then estimating the remaining-ink-reduced status from an ink consuming pace. In this case, the user is allowed to use the MFP 200 without having to worry about managing the remaining amount of ink in the contract cartridges 50.

On the other hand, when detecting that the remaining amount of ink is reduced to or below the particular level, the MFP 200 displays on the touch panel 240 a warning screen for prompting the user to replace the contract cartridge 50 that is in the remaining-ink-reduced status (S43). Hereinafter, a sequence of processes related to displaying the warning screen, which provides a notification that the remaining amount of ink in the contract cartridge 50 is equal to or less than the particular level, may be referred to as a "warning screen display process." The warning screen display process in the illustrative embodiment will be described later in detail with reference to FIG. 6. Then, the MFP 200 performs a loop process to repeatedly perform S27, S43, and the aforementioned regular communication while the delivery contract and the printing contract are in effect, and executes S25 every month to reset the contract number of printed pages to zero.

Next, a contract cancellation process to cancel the delivery contract and the printing contract will be described with reference to FIG. 4. In the contract cancellation process shown in FIG. 4, when the user who has completed desired printing performs, on the information terminal 300, an appropriate operation to cancel the delivery contract and the printing contract, a withdrawal request is sent by the information terminal 300 (S61), and is received by the information management server 100 (S62). In response to receipt of the withdrawal request, the information management server 100 terminates the counting, started in S31, of the contract number of printed pages by the contract printed page number counter function, and provides the MFP 200 with a notification that the counting of the contract number of printed pages has been terminated (S63). In response to receipt of the notification, the MFP 200 terminates the counting, started in S25, of the contract page count value by the contract counter function (S64).

Thereafter, contract termination information, i.e., an Inactivation instruction is sent by the information management server 100 and received by the MFP 200 (S65). Thereby, the delivery contract and the printing contract are cancelled. In response to the cancellation of the delivery contract and the printing contract, the MFP 200 stops the display, started in S11, of the model numbers of the contract cartridges 50 (S66), and resumes the display, stopped in S10, of the model numbers of the normal cartridges 50 (S67). Then, the contract cancellation process is terminated.

<Details of Warning Screen Display Process by MFP>

When displaying the warning screen on the touch panel 240 as described above, the MFP 200 displays the warning screen with display contents thereon corresponding to a user's contract status at that time. A control procedure of the warning screen display process to be performed by the processor 210 of the MFP 200 to achieve the above method will be described with reference to FIG. 6. The warning screen display process may be performed periodically during the loop process of the aforementioned during-contract-in-effect process, or may be started after the printing process in S27.

Figure 6:
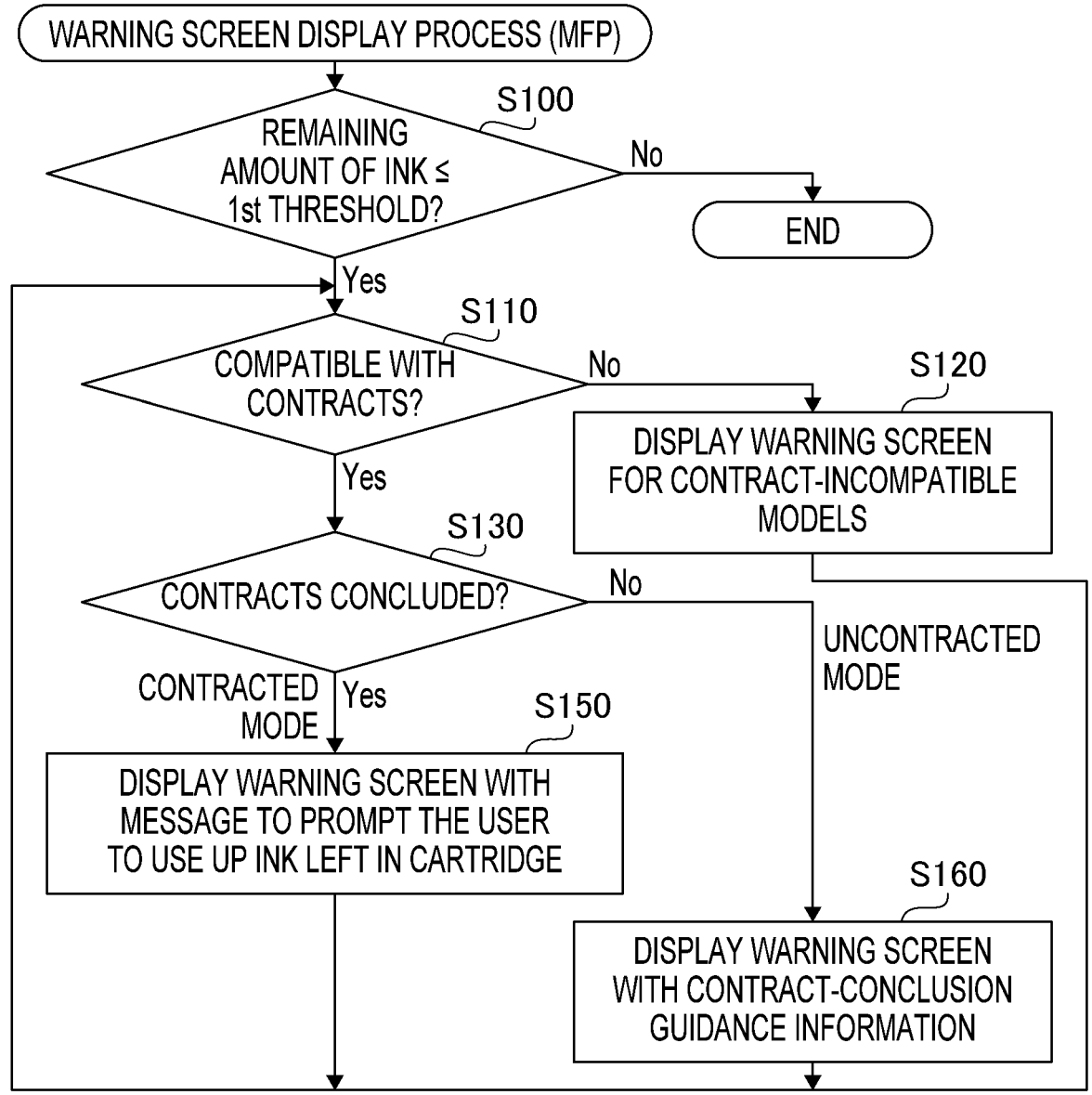
FIG. 6 is a flowchart showing a procedure of a warning screen display process to be performed by the MFP, according to one or more aspects of the present disclosure.

In the warning screen display process shown in FIG. 6, first, in S100, the processor 210 determines whether or not the remaining amount of ink in at least one of the contract cartridges 50 attached is equal to or less than a first threshold. In the illustrative embodiment, the first threshold is set to a value corresponding to a remaining ink level that is slightly higher than a below-mentioned remaining-ink-deficient status in which a corresponding contract cartridge 50 needs to be replaced immediately. At this point of time, when the remaining amount of ink in each of all the contract cartridges 50 is still larger than the first threshold, the processor 210 makes a negative determination in S100 (S100: No). Thereafter, the processor 210 terminates the warning screen display process. Meanwhile, at this point of time, when the remaining amount of ink in at least one of the contract cartridges 50 is already equal to or less than the first threshold, the processor 210 makes an affirmative determination in S100 (S100: Yes). Then, the processor 210 goes to S110. As mentioned in the explanation of S65 in FIG. 4, the processor 210 also makes the negative determination in S100 (S100: No) when the contracts in effect have been cancelled.

In S110, the processor 210 determines whether the MFP 200 is of a model compatible with the delivery contract and the printing contract. Here, if the MFP 200 is sold in a lineup of various models with different specifications, the various model may include not only models compatible with the services provided based on the delivery contract and the printing contract, but also models incompatible therewith. When the MFP 200 is of such a model incompatible with the delivery contract and the printing contract, the MFP 200 receives the contract start information sent by the information management server 100 in S9, without rejecting receipt of the contract start information. However, the MFP 200 does not execute any process of S10, S11, and S15, and therefore, the delivery contract and the printing contract are not concluded. Accordingly, in this case, the MFP 200 does not execute any process of S23, S25, and S29.

The determination in S110 as to whether the MFP 200 is of a model compatible with the delivery contract and the printing contract is made, for instance, by referring to destination information stored in the non-volatile storage device 230. The destination information indicates a destination region where the MFP 200 is shipped and used. In another instance, the determination in S110 may be made based on specific model information that is stored, e.g., in the non-volatile storage device 230 and directly indicates whether the MFP 200 is of a model compatible with the delivery contract and the printing contract. In yet another instance, the determination in S110 may be made based on whether the MFP 200 is enabled to perform data communication of specific information with the information management server 100. When the MFP 200 is of a model incompatible with the delivery contract and the printing contract, the processor 210 makes a negative determination in S110 (S110: No). Then, the processor 210 goes to S120. Meanwhile, when the MFP 200 is of a model compatible with the delivery contract and the printing contract, the processor 210 makes an affirmative determination in S110 (S110: Yes). Then, the processor 210 goes to S130.

In S120, the processor 210 displays a warning screen for contract-incompatible models on the touch panel 240 (see FIG. 7B). After completion of S120, the processor 210 goes back to S110 and repeatedly performs the same procedure as described above.

In S130, the processor 210 determines whether the delivery contract and the printing contract have been concluded, in other words, whether the MFP 200 is in a contracted mode or in an uncontracted mode. Specifically, in the illustrative embodiment, the processor 210 determines in S130 whether there is a contracted flag in the contract storage area. When the delivery contract and the printing contract have already been concluded at this point of time, the processor 210 makes an affirmative determination in S130, i.e., determines that the MFP 200 is in the contracted mode (S130: Yes). Then, the processor 210 goes to S150. Meanwhile, when the delivery contract and the printing contract have not yet been concluded at this point of time, the processor 210 makes a negative determination in S130, i.e., determines that the MFP 200 is in the uncontracted mode (S130: No). Then, the processor 210 goes to S160. As mentioned in the explanation of S65 in FIG. 4, the processor 210 also makes the negative determination in S130 (S130: No) when the contracts in effect have been cancelled.

When the MFP 200 is in the contracted mode (S130: Yes), in S150, the processor 210 displays on the touch panel 240 a warning screen (see FIG. 7D) for contract-compatible models that prompts the user to use up the ink left in the corresponding contract cartridge 50. After completion of S150, the processor 210 goes back to S110, and repeatedly performs the same procedure as described above.

In S160, the processor 210 displays on the touch panel 240 a warning screen (see FIG. 7C) for contract-compatible models that includes contract-conclusion guidance information for recommending conclusion of the contracts when the MFP 200 is in the uncontracted mode. After completion of S150, the processor 210 goes back to S110, and repeatedly performs the same procedure as described above.

<Examples of Warning Screens for Contract-Compatible Models>

FIGS. 7B to 7D show examples of the warning screens that are displayed switchably according to the warning screen display process shown in FIG. 6. When determining in S100 that the remaining amount of ink in at least one of the contract cartridges 50 attached is equal to or less than the first threshold (S100: Yes), the processor 210 adds an "Ink Low" icon in an upper section of the initial screen 240A, as shown in FIG. 7A. The "Ink Low" icon indicates the remaining-ink-reduced status. Thereby, the user is allowed to visually recognize that the remaining amount of ink in at least one of the contract cartridges 50 is reduced to or below the first threshold. At this time, when the user operates the "Ink Low" icon, the processor 210 immediately displays one of three warning screens 240E, 240F, and 240G that are shown in FIGS. 7B, 7C, and 7D, respectively.

The warning screen 240E (see FIG. 7B) is a warning screen for contract-incompatible models that is displayed in S120 when it is determined in S110 that the MFP 200 is of a model incompatible with the delivery contract and the printing contract (S110: No). The warning screen 240E for contract-incompatible models displays thereon the model number (e.g., "LC401YS" in the example shown in FIG. 7B) of the normal cartridge 50 in which the remaining amount of ink is reduced to or below the first threshold, as well as a "Print" button and a "Back" button as operable buttons. Thereby, to the user of the contract-incompatible model who is not allowed to conclude the contracts, it is possible to display and print only minimum necessary information such as the model number of the normal cartridge 50 to be replaced, without displaying any information on the contracts.

Figure 8B:
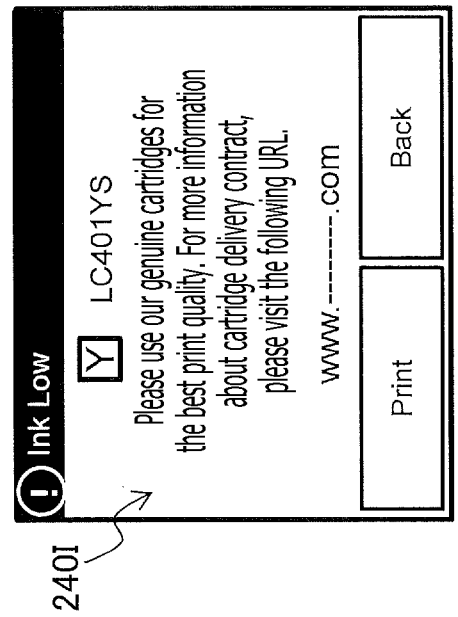
FIG. 8B shows an example of an information display screen with contract-conclusion guidance information, displayed on the MFP, according to one or more aspects of the present disclosure.
Figure 8A:
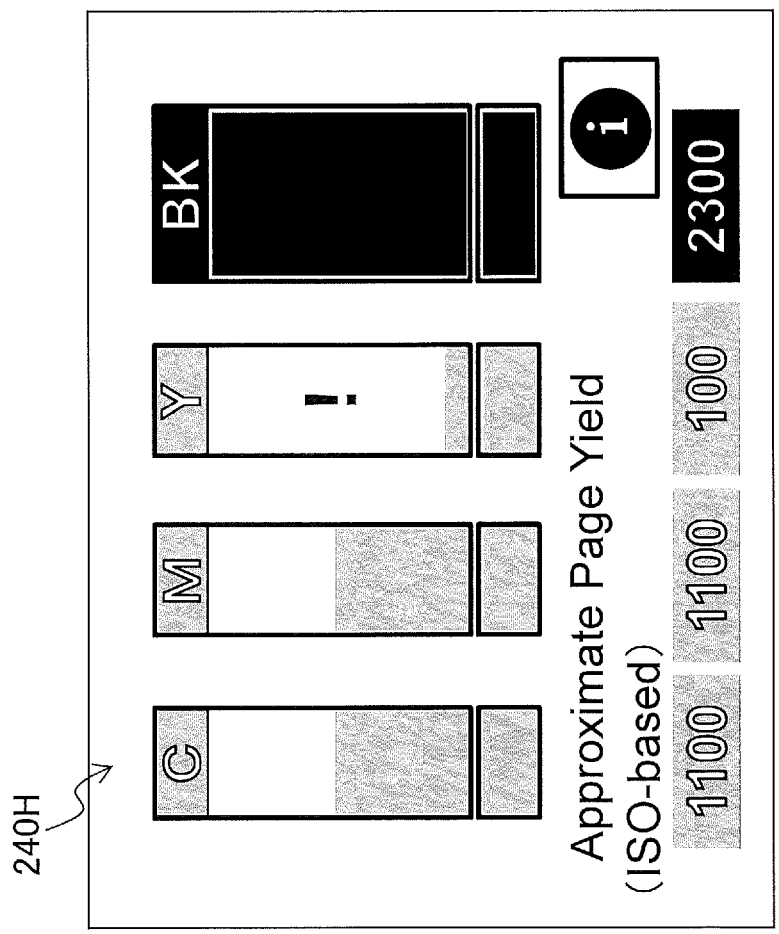
FIG. 8A shows an example of a remaining ink amount display screen displayed on the MFP, according to one or more aspects of the present disclosure.

The warning screen 240F shown in FIG. 7C is a warning screen that is displayed in S160 when it is determined that the MFP 200 is of a model compatible with the delivery contract and the printing contract (S110: Yes) and that the MFP 200 is in the uncontracted mode (S130: No). The warning screen 240F displays thereon a URL of a service site, which contains descriptions about service contents and contract procedures for the delivery contract and the printing contract, in a form of a two-dimensional code such as a QR code as the contract-conclusion guidance information for recommending the user who has not concluded the contracts to conclude the contracts. It is noted that "QR code" is a registered trademark of Denso Wave Incorporated. In addition, the warning screen 240F includes a message "Soon to be replaced" corresponding to the remaining-ink-reduced status, as well as the model number (e.g., "LC401YS" in the example shown in FIG. 7C) of the normal cartridge 50 in the remaining-ink-reduced status. Further, on the warning screen 240F, an "Estimated Ink Volume" button and an o are displayed as operable buttons. When the "Estimated Ink Volume" button is operated, a remaining ink amount display screen 240H (see FIG. 8A) is displayed, which shows the remaining amount of ink in the corresponding normal cartridge 50 for each color. When the "Info" button is operated, an information display screen 240I (see FIG. 8B) is displayed, which shows the URL of the aforementioned service site in a text format as further contract-conclusion guidance information, as well as the model number (e.g., "LC401YS" in the example shown in FIG. 8B) of the normal cartridge 50 in the remaining-ink-reduced status. On the information display screen 240I, a "Print" button and a "Back" button are displayed as operable buttons. Thereby, to the user of the contract-compatible model who has not concluded the contracts, it is possible to display the contract-conclusion guidance information for recommending the conclusion of the contracts, as well as the model number of the normal cartridge 50 to be replaced. In addition to the aforementioned URL, other guidance information such as a service logo mark may also be displayed as the contract-conclusion guidance information.

Figure 9:
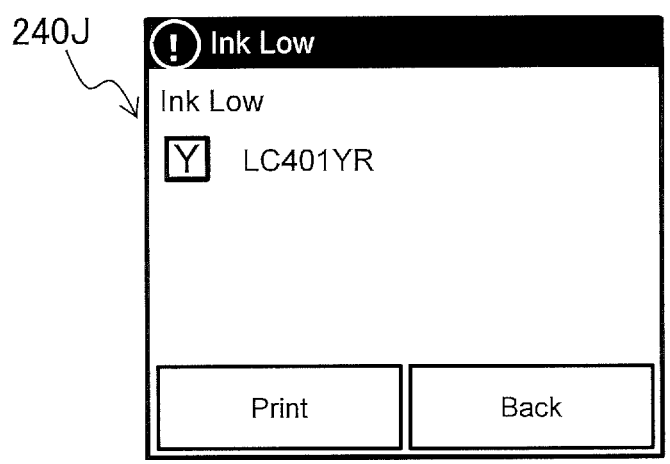
FIG. 9 shows an example of an information display screen with a model number of a contract cartridge to be replaced, displayed on the MFP, according to one or more aspects of the present disclosure.

Referring back to FIGS. 7A-7D, the warning screen 240G (see FIG. 7D) is a warning screen that is displayed in S150 when it is determined that the MFP 200 is of a model compatible with the delivery contract and the printing contract (S110: Yes) and that the MFP 200 is in the contracted mode (S130: No). The warning screen 240G includes the model number (e.g., "LC401YR" in the example shown in FIG. 7D) of the contract cartridge 50 for a particular color that is in the remaining-ink-reduced status. Further, the warning screen 240G includes a message as usage caution information for prompting the user who has concluded the contracts to use up the ink left in the contract cartridge 50 to be replaced that is attached to the cartridge holder 51 at that time and then replace the contract cartridge 50 with a new contract cartridge 50 delivered. In addition, on the warning screen 240G, an "Estimated Ink Volume" button and an "Info" button are displayed as operable buttons. When the "Estimated Ink Volume" button is operated, the remaining ink amount display screen 240H (see FIG. 8A) is displayed. When the "Info" button is operated, an information display screen 240J (see FIG. 9) is displayed. As shown in FIG. 9, the information display screen 240J displays thereon a "Print" button and a "Back" button as operable buttons, as well as the model number (e.g., "LC401YR" in the example shown in FIG. 9) of the contract cartridge 50 to be replaced that is in the remaining-ink-reduced status. In the illustrative embodiment, the above explanation has been provided of the case in which one of the contract cartridges 50 is in the remaining-ink-reduced status. However, for instance, when a remaining amount of ink in a commercial cartridge for a particular color is reduced to or below a particular level, as well, the processor 210 may display a model number of a contract cartridge 50 for the same particular color.

Thereby, to the user of the contract-compatible model who has concluded the delivery contract and the printing contract, it is possible to display and print only minimum necessary information such as the usage caution information required only by the said user and the model number of the contract cartridge 50 to be replaced, without displaying the aforementioned contract-conclusion guidance information. In the illustrative embodiment, an ink-consumed status is detected based on the remaining amount of ink. However, for instance, the ink-consumed status may be detected based on an amount of ink consumed since the attachment of the corresponding ink cartridge 50. In this case, a consumed ink amount display screen (not shown) may be displayed instead of the remaining ink amount display screen 240H.

The example of the usage caution information displayed on the warning screen 240G shown in FIG. 7D, i.e., a message "Please set the delivered new contract cartridge after using up the ink left in the cartridge currently in use" is to provide the user with a caution to be confirmed regarding the replacement of the contract cartridge 50. Depending on the user's printing method, there is a possibility that a new contract cartridge 50 may be delivered before the ink left in the (old) contract cartridge 50 to be replaced, which is attached to the cartridge holder 51 at that time, is used up. In such a case, it is possible to prevent the user from replacing the old contract cartridge 50 with the new contract cartridge 50 before using up the ink left in the old contract cartridge 50 due to misunderstanding of the contents of the delivery contract, and to prompt the user to use up the ink left in the old contract cartridge 50.

<Advantageous Effects of Illustrative Embodiment>

As described above, in the illustrative embodiment, the processor 210 of the MFP 200 determines in S100 whether or not the remaining amount of ink in at least one ink cartridge 50 is equal to or less than the first threshold as a result of the ink cartridges 50, which are expendable supplies, being consumed according to the user's usage. When determining that the remaining amount of ink is equal to or less than the first threshold (S100: Yes), the processor 210 executes S150. In this case, the warning screen 240G, which includes the usage caution information based on a premise that the delivery contract for the ink cartridges 50 has been concluded, is displayed on the touch panel 240.

Thereby, it is possible to avoid providing a user who has concluded the delivery contract with meaningless and unnecessary information such as guidance information for recommending all the users, without any exception, to conclude the delivery contract regardless of whether each of the users has concluded the delivery contract. Further, it is possible to appropriately provide the user with what the user wants to know based on the remaining amount of ink in each ink cartridge 50.

Further, in the illustrative embodiment, in particular, it is possible to provide the user who has concluded the delivery contract with what the user wants to know, by displaying the usage caution information when the MFP 200 is in the contracted mode. Further, it is possible to lead a user who has not concluded the delivery contract to conclude the delivery contract, by displaying the contract-conclusion guidance information when the MFP 200 is in the uncontracted mode.

In the illustrative embodiment, in particular, when the remaining amount of ink in an ink cartridge 50 is equal to or less than the first threshold, one of the warning screens 240E, 240F, and 240G is displayed on the touch panel 240 to inform the user that the remaining amount of ink in the ink cartridge 50 is equal to or less than the first threshold. Thereby, it is possible to cause the user to be aware that the ink left in the ink cartridge 50 will soon run out.

Further, in the illustrative embodiment, in particular, when the user operates the "Estimated Ink Volume" button via the operation I/F 250 in response to one of the warning screens 240F and 240G being displayed, the remaining ink amount display screen 240H is displayed on the touch panel 240. On the remaining ink amount display screen 240H, the remaining amount of ink in each ink cartridge 50 is shown as a consumed ink amount status. Thereby, the user is allowed to specifically recognize how much ink is now remaining in each ink cartridge 50.

Further, in the illustrative embodiment, in particular, when the user operates the "Info" button via the operation I/F 250 in response to the warning screen 240F being displayed when the MFP 200 is in the uncontracted mode, the information display screen 240I, which includes the contract-conclusion guidance information, is newly displayed on the touch panel 240. Thereby, it is possible to lead a user who has not yet concluded the delivery contract to conclude the delivery contract.

In the illustrative embodiment, in particular, when the MFP 200 is in the contracted mode, the usage caution information is shown as supply-related information on the warning screen 240G. Thereby, the user is allowed to know the contents of the usage caution information at the same time as when the user knows that the remaining amount of ink is equal to or less than the first threshold.

In the illustrative embodiment, in particular, the supply-related information includes the usage caution information regarding the use of the supplies. Thereby, a user who has already concluded the contracts is allowed to properly know necessary information such as how to continue to use an ink cartridge 50 currently in use, and whether a new ink cartridge 50 may be used by replacement for the currently-used ink cartridge 50 immediately after arrival of the new ink cartridge 50.

In the illustrative embodiment, in particular, the usage caution information is displayed to prompt the user to use up the ink left in the ink cartridge 50 attached to the cartridge holder 51. Thereby, the user is allowed to recognize that the user should not now replace the currently-used ink cartridge 50 in which the remaining amount of ink is equal to or less than the first threshold, but replace the currently-used ink cartridge 50 after using up the ink left in the currently-used ink cartridge 50.

Further, in the illustrative embodiment, in particular, the MFP 200 may use the printing service based on the printing contract separately from the delivery service. Thus, when a plurality of services are previously prepared for the MFP 200, a display mode in which the touch panel 240 displays thereon the supply-related information changes depending on which of those services is provided to the MFP 200. For instance, the display contents to be displayed on the touch panel 240 in response to the operation of the "Info" button changes depending on whether the printing contract has been concluded. More specifically, when the printing contract has not been concluded, the model number of the normal cartridge 50 to be replaced is displayed on the information display screen 240I in response to the "Info" button being operated on the warning screen 240F. Meanwhile, when the printing contract has been concluded, the model number of the contract cartridge 50 to be replaced is displayed on the information display screen 240J in response to the "Info" button being operated on the warning screen 240G. Thereby, it is possible to display the supply-related information in an easy-to-understand manner with appropriate contents according to which service the user is provided with.

Further, in the illustrative embodiment, in particular, the processor 210 determines in S110 whether the MFP 200 is of a model compatible with the delivery contract. Then, the processor 210 determines in S130 whether the delivery contract has been concluded, only when the MFP 200 is of a model compatible with the delivery contract. In this case, when the delivery contract for the ink cartridges 50 has been concluded, the supply-related information is displayed based on the premise that the delivery contract has been concluded. The determination in S110 makes it possible to use the same processing program in common between the models compatible with the delivery contract and the models incompatible with the delivery contract. In other words, there is no need to prepare separate processing programs for the models compatible with the delivery contract and for the models incompatible with the delivery contract.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications may be feasible.

<Modifications>
(1) When a Second Threshold Lower than the First Threshold is Set In the aforementioned illustrative embodiment, only the first threshold is set as a threshold value to be compared with the remaining amount of ink in each ink cartridge 50. As described above, the first threshold is a threshold value corresponding to a remaining ink level that is slightly higher than the remaining-ink-deficient status in which a corresponding contract cartridge 50 needs to be replaced immediately. In a first modification according to aspects of the present disclosure, a second threshold may be set as a threshold value lower than the first threshold and corresponding to the remaining-ink-deficient status. In this case, when the remaining amount of ink in at least one ink cartridge 50 is equal to or less than the second threshold, a corresponding warning screen may be displayed.

Figure 10:
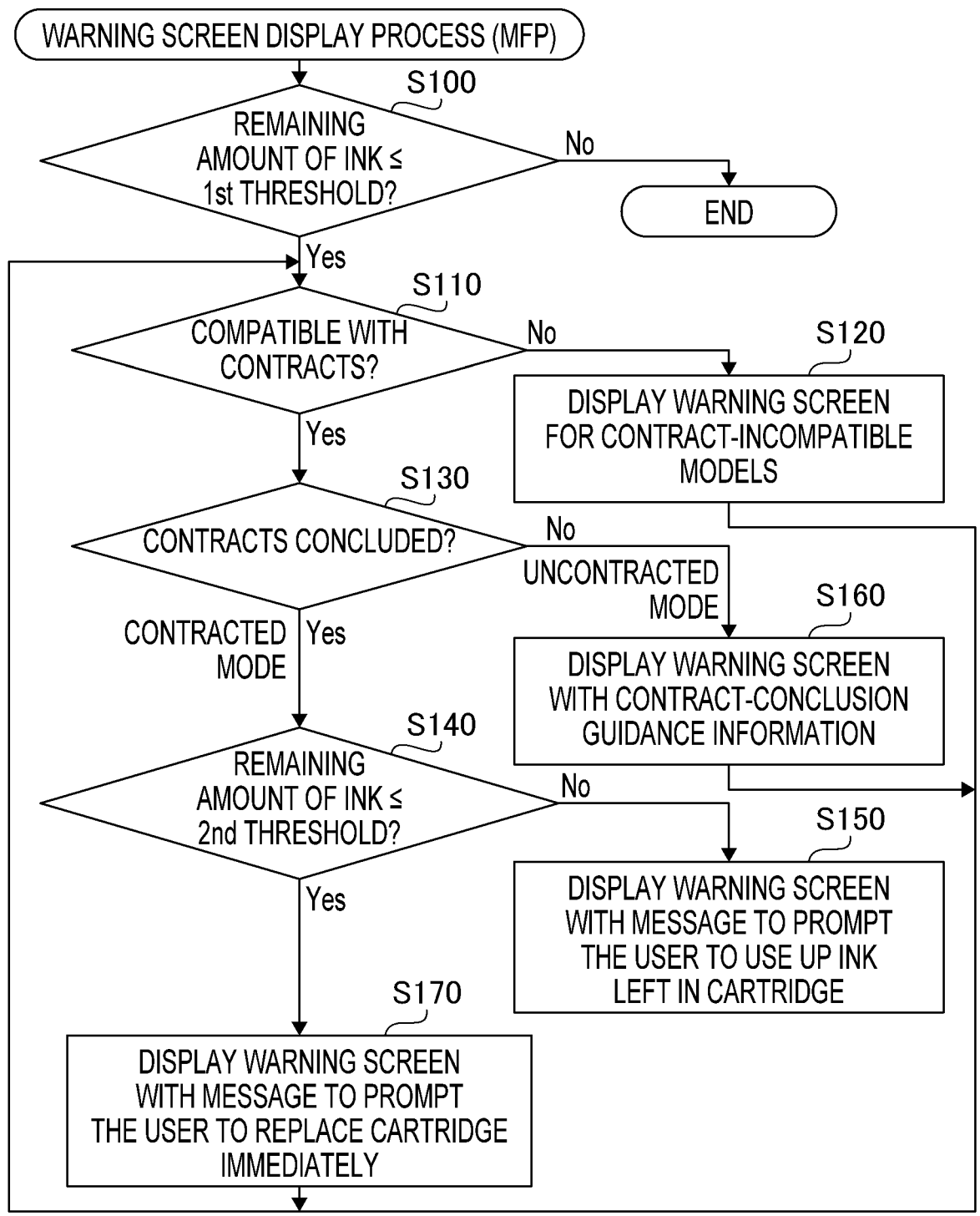
FIG. 10 is a flowchart showing a procedure of a warning screen display process to be performed by the MFP when a second threshold is set, according to one or more aspects of the present disclosure.

FIG. 10, which corresponds to FIG. 6, is a flowchart showing a procedure of a warning screen display process to be performed by the MFP 200 in the first modification. As shown in FIG. 10, in the first modification, the processor 210 of the MFP 200 makes a determination of S140 after determining in S130 that the MFP 200 is in the contracted mode. Then, the processor 210 switches display contents on a warning screen according to the determination of S140. Namely, the processor 210 goes to S140 in response to determining in S130 that the MFP 200 is in the contracted mode (S130: Yes).

In S140, the processor 210 determines whether or not the remaining amount of ink in at least one of the attached contract cartridges 50 is equal to or less than the second threshold. In the first modification, the second threshold is lower than the first threshold, and is set as a threshold value corresponding to the remaining-ink-deficient status in which a corresponding contract cartridge 50 needs to be replaced immediately. At this point of time, when the remaining amount of ink in each contract cartridge 50 is still larger than the second threshold, the processor 210 makes a negative determination (S140: No), and goes to S150 described above. Meanwhile, at this point of time, when the remaining amount of ink in at least one contract cartridge 50 is equal to or less than the second threshold, the processor 210 makes an affirmative determination (S140: Yes), and goes to S170.

Figure 11:
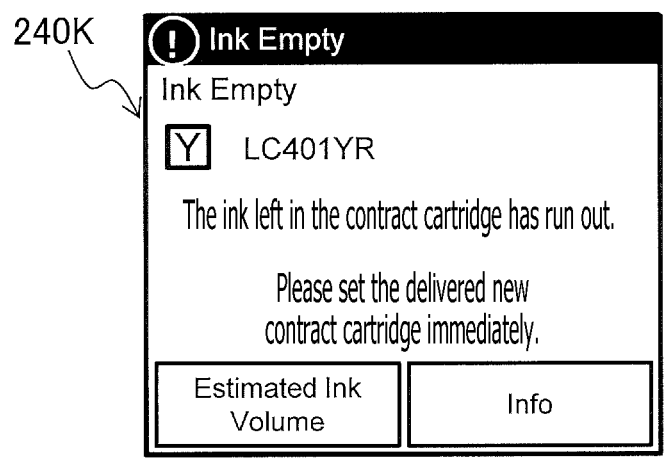
FIG. 11 shows an example of a warning screen displayed when a remaining amount of ink in the contract cartridge to be replaced is reduced to or below the second threshold, according to one or more aspects of the present disclosure.

In S170, the processor 210 displays on the touch panel 240 a warning screen 240K for prompting the user to immediately replace a contract cartridge 50 to be replaced that is attached to the cartridge holder 51. After completion of S170, the processor 210 goes back to the aforementioned step S110, and repeatedly performs the same procedure as described above. The procedure, other than the process of S130 to S170 via S140, of the warning screen display process shown in FIG. 10 is substantially the same as in FIG. 6. Hence, an explanation of the same procedure will be omitted. As shown in FIG. 11, for instance, the warning screen 240K displays thereon a message "The ink left in the contract cartridge has run out. Please set the delivered new contract cartridge immediately." as the usage caution information, as well as the model number (e.g., "LC401YR" in the example shown in FIG. 11) of a contract cartridge 50 that is in the remaining-ink-deficient status. In addition, on the warning screen 240K, "Ink Empty" indicating the remaining-ink-deficient status is displayed in an upper section, instead of "Ink Low" indicating the remaining-ink-reduced status. Further, on the warning screen 240K, an "Estimated Ink Volume" button and an "Info" button are displayed as operable buttons.

According to the first modification, the displayed usage caution information prompts the user to replace the ink cartridge 50 when the remaining amount of ink in the ink cartridge 50 is reduced to the second threshold that is different from the first threshold. Thereby, the user is allowed to recognize that the currently-used ink cartridge 50 in which the remaining amount of ink is reduced to the first threshold should not be replaced now, but should be used until the remaining amount of ink is reduced to the second threshold and then be replaced.

On the warning screen 240F (see FIG. 7C) displayed in the remaining-ink-reduced status when the MFP 200 is in the uncontracted mode, the message "Soon to be replaced" corresponding to the remaining-ink-reduced status is displayed. However, instead of the message, the warning screen 240F may display thereon information for prompting the user to replace the contract cartridge 50 attached to the cartridge holder 51. Specifically, for instance, the warning screen 240F may display a message "Please set the delivered new contract cartridge immediately" (not specifically shown) which should be displayed in the remaining-ink-deficient status.

According to the first modification, it is possible to prompt the user to replace the ink cartridge 50 at an appropriate timing according to whether the MFP 200 is in the contracted mode or in the uncontracted mode. Specifically, when the MFP 200 is in the contracted mode, a new contract cartridge 50 is delivered with no need for the user to go to purchase it. Therefore, it is not too late to prompt the user to replace the contract cartridge 50 currently in use at the timing when the remaining amount of ink in the contract cartridge 50 is reduced to the second threshold, e.g., when the contract cartridge 50 comes into an empty state (i.e., the remaining-ink-deficient status). It is also desirable from an economic standpoint regarding the use of the contract cartridge 50. On the other hand, when the MFP 200 is in the uncontracted mode, the user needs to obtain a new normal cartridge 50 by himself Therefore, it is too late to warn the user at the timing when the normal cartridge 50 currently in use comes into the empty state. In this case, it is preferable to warn the user at the timing before the currently-sed normal cartridge 50 really needs to be replaced. Thus, it is possible to appropriately prompt the user to replace the ink cartridge 50 by changing the timing to provide a warning regarding the replacement of the ink cartridge 50 depending on whether the MFP 200 is in the contracted mode or in the uncontracted mode.

(2) When a Shipping Status is Displayed on the Warning Screen in the Contracted Mode In the aforementioned illustrative embodiment, except for the model number of the contract cartridge 50 that is in the remaining-ink-reduced status, only the usage caution information is displayed on the warning screen 240G when the MFP 200 is in the contracted mode. In a second modification according to aspects of the present disclosure, a shipping status of the ink cartridge 50 in the delivery service company at that time may be displayed on the warning screen 240G, along with the usage caution information.

Figure 12A:
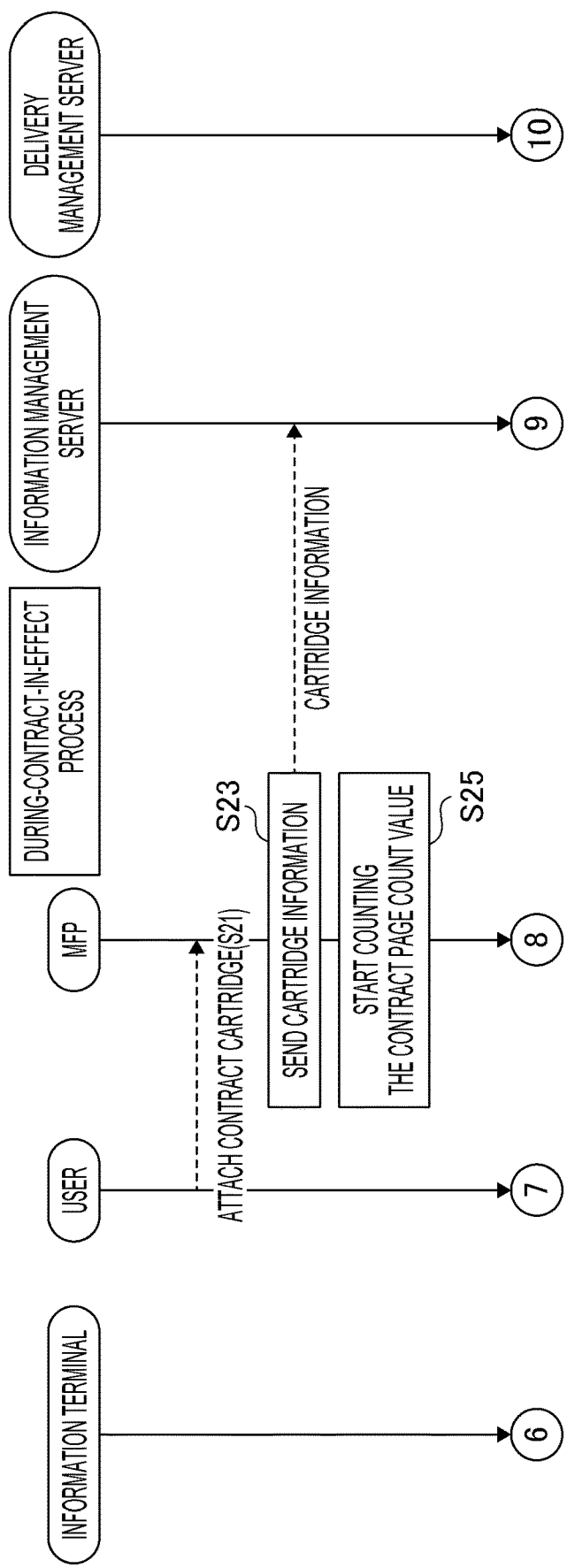

FIGS. 12A and 12B, which correspond to FIGS. 3A and 3B, are a set of sequence charts showing a procedure of a during-contract-in-effect process in the second modification. Namely, FIGS. 12A and 12B illustrate a sequence of processes to be performed by the MFP 200, the information management server 100, the delivery management server 400, and the information terminal 300 while the delivery contract is in effect, in the second modification.

As shown in FIGS. 12A and 12B, in the second modification, when the remaining amount of ink reduced to or below the first threshold is detected in a warning screen display process performed by the MFP 200, the MFP 200 sends inquiry information to the information management server 100 (S44). The inquiry information is for inquiring about the shipping status of the contract cartridge 50 to be replaced in the delivery service company at that time. In reply to the inquiry information from the MFP 200, the information management server 100 sends to the MFP 200 shipping status information indicating the shipping status of the contract cartridge 50 to be replaced (S45). Thereafter, the MFP 200 displays a warning screen along with the received shipping status information (S46). The procedure, other than the above processes of S44, S45, and S46, of the during-contract-in-effect process shown in FIGS. 12A and 12B is substantially the same as in FIGS. 3A and 3B. Hence, an explanation of the same procedure will be omitted.

Figure 13:
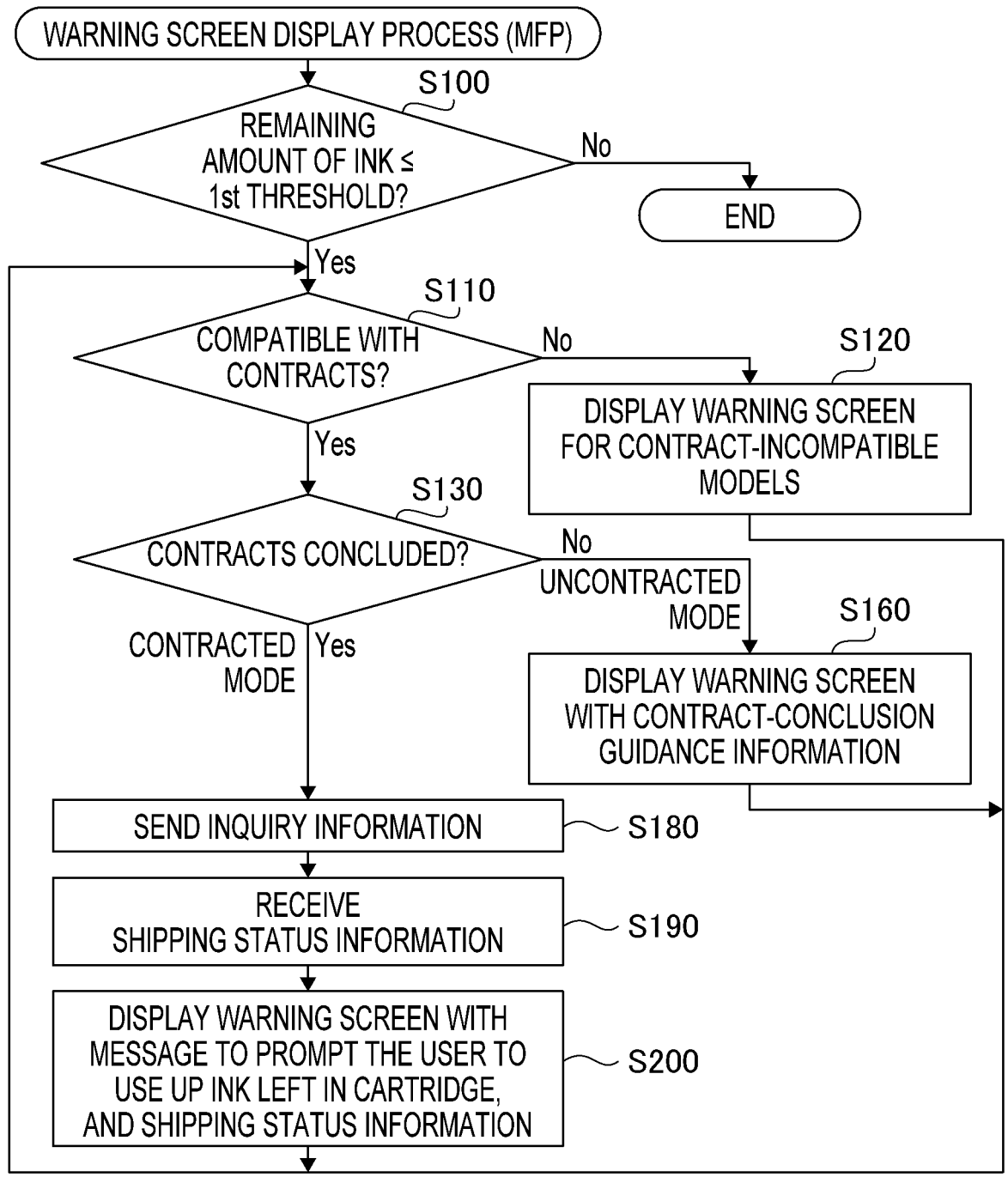
FIG. 13 is a flowchart showing a procedure of a warning screen display process to display the shipping status of the new contract cartridge, according to one or more aspects of the present disclosure.

FIG. 13, which corresponds to FIG. 6, shows the warning screen display process performed by the MFP 200 in the second modification. As shown in FIG. 13, in the second modification, when making an affirmative determination in S130 (i.e., when determining in S130 that the MFP 200 is in the contracted mode) (S130: Yes), the processor 210 of the MFP 200 goes to S180. It is noted that S130 in FIG. 13 is the same step as S130 in FIG. 6.

In S180, the processor 210 sends to the information management server 100 the inquiry information to inquire the shipping status of the contract cartridge 50 to be replaced.

Subsequently, the processor 210 proceeds to S190, in which the processor 210 receives the shipping status information from the information management server 100.

Next, the processor 210 proceeds to S200, in which the processor 210 displays on the touch panel 240 a warning screen 240L on which the received shipping status information is shown along with the usage caution information. After completion of S200, the processor 210 goes back to S110, and repeatedly performs the same procedure as described above. The procedure, other than the above processes of S180, S190, and S200, of the warning screen display process shown in FIG. 13 is substantially the same as in FIG. 6. Hence, an explanation of the same procedure will be omitted.

Figure 14:
FIG. 14 shows an example of a warning screen on which the shipping status of the new contract cartridge is displayed, according to one or more aspects of the present disclosure.

As shown in FIG. 14, for instance, the warning screen 240L displays thereon the model number (e.g., "LC401YR" in the example shown in FIG. 14) of the contract cartridge 50 that is in the remaining-ink-reduced status, the same usage caution information as displayed on the warning screen 240G when the MFP 200 is in the contracted mode, and the shipping status information (e.g., "Shipping Status: Shipped" in the example shown in FIG. 14). As described above, the information management server 100 recognizes the remaining amount of ink in each ink cartridges 50 in the MFP 200 through the regular communication with the MFP 200. Then, in S42, when receiving the remaining-ink-reduced status from the MFP 200, the information management server 100 sends, to the delivery service company, a shipping instruction to deliver a contract cartridge 50 to the user. Therefore, depending on a time-series relationship between the execution of S44 (S180) and the regular communication, the shipping status information may represent "Not Shipped."

According to the second modification, the supply-related information contains the shipping status information regarding the shipping status of the ink cartridge 50. Thereby, the user who has concluded the delivery contract is allowed to properly know whether a new ink cartridge 50 for replacement has already been shipped or has not yet been shipped, for the currently-used ink cartridge 50 in which the remaining amount of ink is equal to or less than the first threshold.

In the second modification, in particular, when the remaining amount of ink in an ink cartridge 50 currently used by the user is reduced to or below the first threshold, the processor 210 sends the inquiry information in S180. Thereby, an inquiry about the shipping status of a new ink cartridge 50 for replacement is sent, for instance, to the information management server 100. When the shipping status information is sent, for instance, by the information management server 100 in reply to the inquiry information, the processor 210 receives the shipping status information in S190. Then, in S200, the processor 210 displays the received shipping status information on the touch panel 240. Thereby, the user is allowed to know the latest shipping status.

(3) When an Optional Shipping Request is Accepted on the Warning Screen in the Contracted Mode In the aforementioned second modification, the shipping status information is displayed along with the usage caution information on the warning screen 240L when the MFP 200 is in the contracted mode. In a third modification according to aspects of the present disclosure, an optional shipping request for an ink cartridge 50 from the user, which is different from an automatic shipping instruction via the regular communication, is accepted on a warning screen.

Figure 15A:
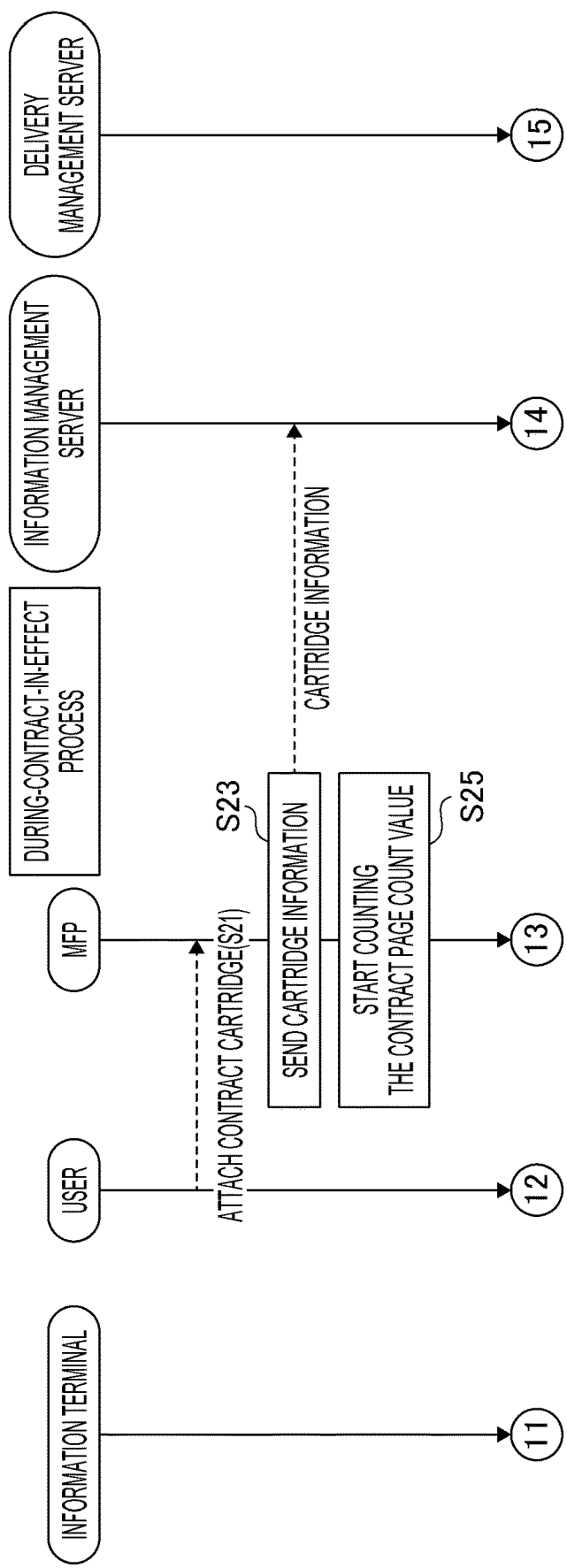
FIGS. 15A and 15B are a set of sequence charts showing a procedure of a during-contract-in-effect process to accept an optional shipping request for a new contract cartridge, according to one or more aspects of the present disclosure.
Figure 15B:
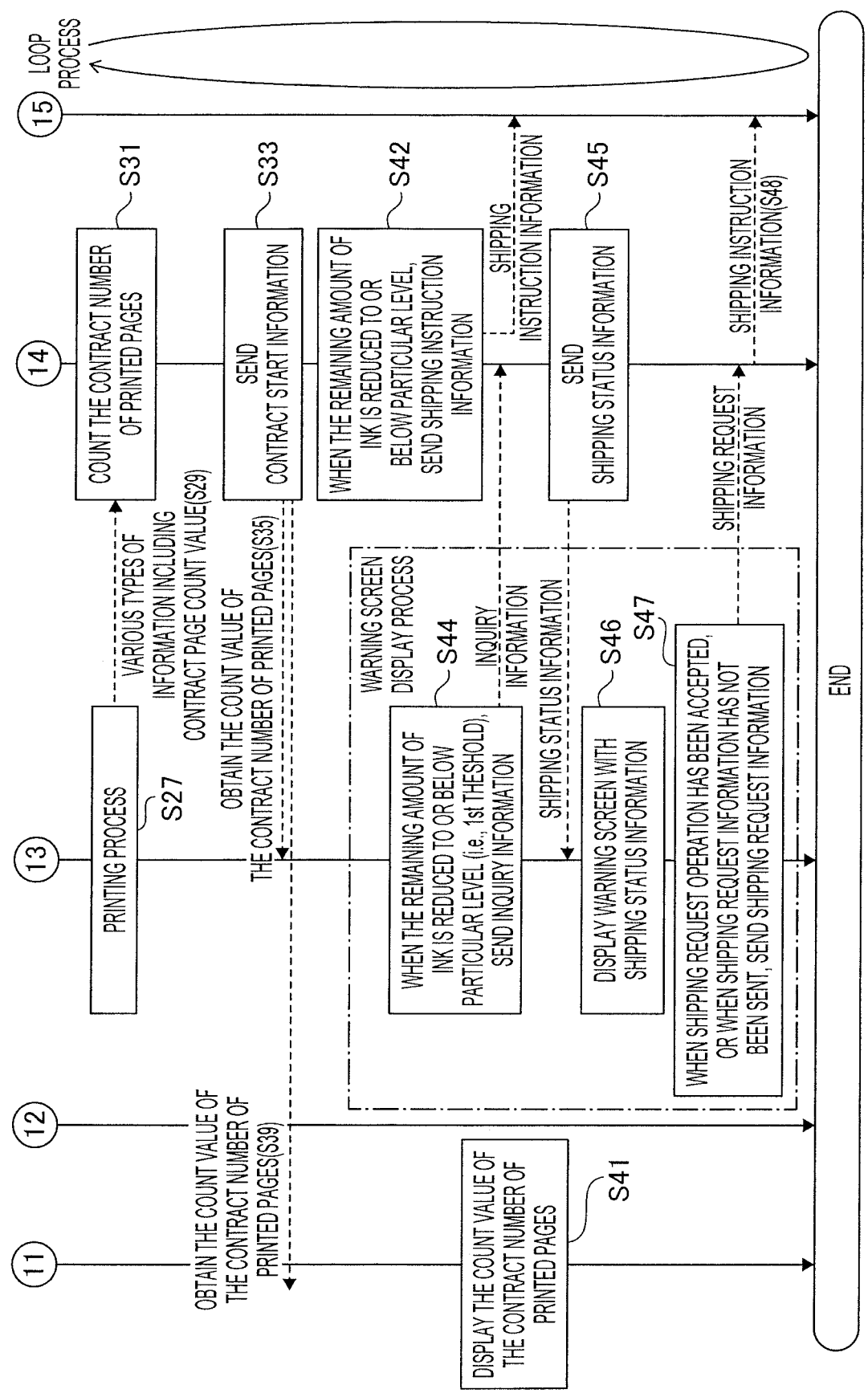

FIGS. 15A and 15B, which correspond to FIGS. 12A and 12B, are a set of sequence charts showing a procedure of a during-contract-in-effect process in the third modification. Namely, FIGS. 15A and 15B illustrate a sequence of processes to be performed by the MFP 200, the information management server 100, the delivery management server 400, and the information terminal 300 while the delivery contract is in effect, in the third modification.

In the third modification, as shown in FIGS. 15A and 15B, in a warning screen display process performed by the MFP 200, after displaying the warning screen in S46, when a user operation to make an optional shipping request for an ink cartridge 50 has been accepted, or when, for instance, shipping request information has not yet been sent, the MFP 200 sends shipping request information to the information management server 100 (S47). When receiving the shipping request information, the information management server 100 sends shipping instruction information to the delivery service company (S48). The procedure, other than the above processes of S47 and S48, of the during-contract-in-effect process shown in FIGS. 15A and 15B is substantially the same as in FIGS. 12A and 12B. Hence, an explanation of the same procedure will be omitted.

Figure 16:
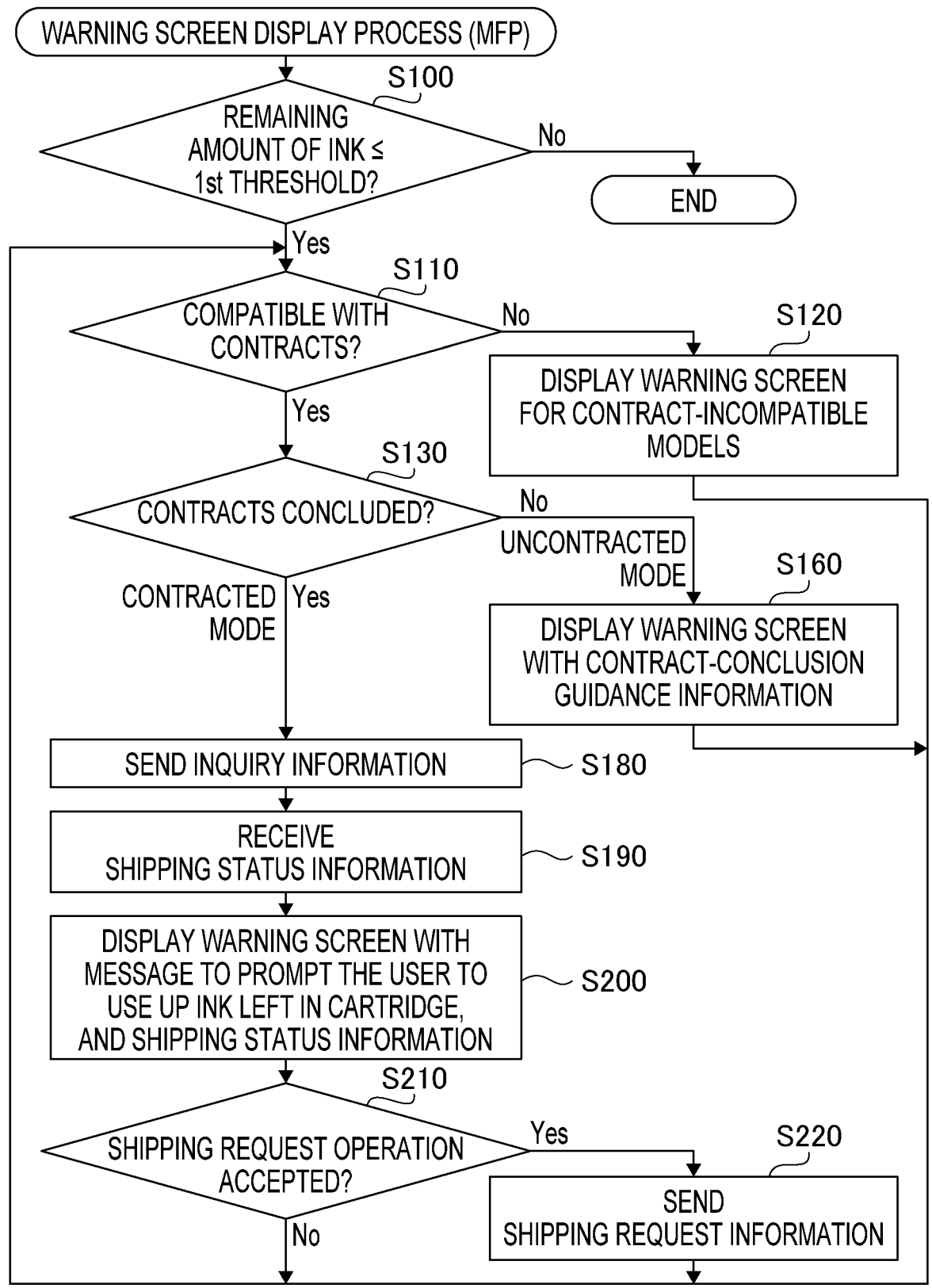
FIG. 16 is a flowchart showing a procedure of a warning screen display process to accept the optional shipping request for the new contract cartridge, according to one or more aspects of the present disclosure.
Figure 17:
FIG. 17 shows an example of a warning screen to accept the optional shipping request for the new contract cartridge, according to one or more aspects of the present disclosure.

FIG. 16 is a flowchart showing a procedure of the warning screen display process performed by the MFP 200 in the third modification. In the third modification, as shown in FIG. 16, the processor 210 of the MFP 200 goes to S210 after displaying a warning screen M (see FIG. 17) in S200. As shown in FIG. 17, the warning screen M includes a shipping request button displayed thereon.

In S210, the processor 210 determines whether the shipping request button has been operated on the warning screen 240M, i.e., whether a user operation (hereinafter, which may be referred to as a "shipping request operation") to make an optional shipping request has been accepted via the warning screen 240M. If there is no shipping request operation, the processor 210 makes a negative determination in S210 (S210: No). Thereafter, the processor 210 goes back to S110, and repeatedly performs the same procedure as described above. If there is a shipping request operation, the processor 210 makes an affirmative determination in S210 (S210: Yes), and then goes to S220.

In S220, the processor 210 sends, to the information management server 100, shipping request information to request the delivery service company to ship a new ink cartridge 50 for replacement.

For instance, as shown in FIG. 17 corresponding to FIG. 14, the warning screen 240M includes a "Request Shipping" button displayed thereon instead of the "Estimated Ink Volume" button. As shown in FIG. 17, if the shipping status at that time is "Not Shipped," and the user wants to actively obtain a new ink cartridge 50, the user may operate the "Request Shipping" button to send the shipping request information to the information management server 100.

Figure 18:
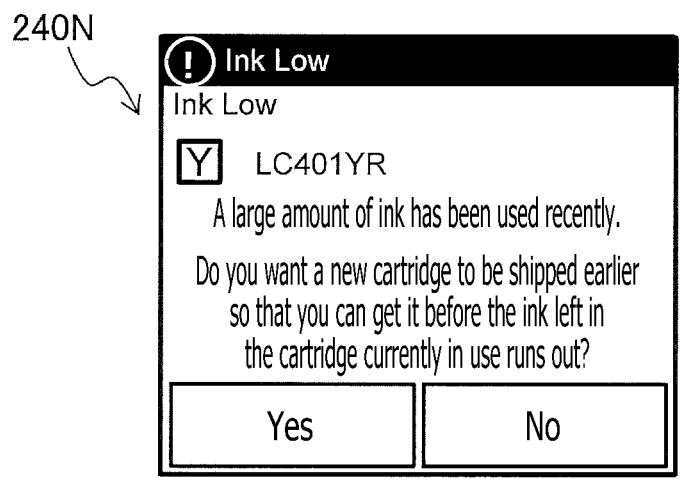
FIG. 18 shows an example of an operation confirmation screen displayed after acceptance of the optional shipping request for the new contract cartridge on the warning screen, according to one or more aspects of the present disclosure.

The shipping request information may contain only equivalent information of the regular communication that contains information on the remaining amount of ink. Further, the shipping request information may have separate information attached (not specifically shown) that indicates that the shipping request information corresponds to a proactive shipping request from the user. Instead of sending the shipping request information immediately after the operation of the "Request Shipping" button, for instance, an operation confirmation screen 240N as shown in FIG. 18 may be displayed once. In this case, the shipping request information may not be sent until the shipping request operation is performed again (i.e., until a "Yes" button is operated on the operation confirmation screen 240N).

In the third modification, in particular, when the user performs a predetermined shipping request operation in response to the shipping status information displayed on the touch panel 240 when the MFP 200 in the contracted mode, the processor 210 accepts the shipping request operation in S210 executed by the processor 210. Then, further, in S220, the processor 210 sends the shipping request information for a new ink cartridge 50 to, for instance, the information management server 100. Thereby, the user is allowed to send a shipping request based on a manual operation when the user aggressively wishes to have a new ink cartridge 50 for replacement shipped.

(4) Other Modifications

In the aforementioned illustrative embodiment and modifications, the explanations thereof have been provided in the example case where the user has concluded the two contracts, i.e., the delivery contract and the printing contract, with the service provider that is the contractor. According to aspects of the present disclosure, it may be sufficient if the user is allowed to conclude a delivery contract regarding at least delivery of the ink cartridges 50 as expendable supplies. Regarding the printing contract described above and other contracts not specifically described, whether the user is allowed to conclude those contracts or contents of the contracts concluded may be applied individually or in cooperation as appropriate. Further, the combination of displays in each mode of the contracted mode and the uncontracted mode described in each of the aforementioned embodiment and modifications is not limited to the same combination as described above.

Regarding the sequences and flows shown in FIGS. 2, 3, 4, 6, 10, 12, 13, 15, and 16, aspects of the present disclosure may not necessarily be limited to the same sequences and flows as described above. For instance, the procedures of the sequences and flows may be changed by adding one or more steps, deleting one or more steps, and/or changing the order of one or more steps.

The following shows examples of associations between elements exemplified in the aforementioned illustrative embodiments and modifications and elements according to aspects of the present disclosure. The print processing system 1 may be an example of a "print processing system" according to aspects of the present disclosure. The information management server 100 may be an example of a "server" according to aspects of the present disclosure. The MFP 200 may be an example of a "printing apparatus" according to aspects of the present disclosure. The cartridge holder 51 may be an example of a "holder" according to aspects of the present disclosure. The print engine 290 may be an example of a "print engine" according to aspects of the present disclosure. The display 240 may be an example of a "display" according to aspects of the present disclosure. The processor 210 may be included in a "controller" according to aspects of the present disclosure. The "controller" according to aspects of the present disclosure may further include the storage device 215 storing the print processing program in the program storage area 232. The operation I/F 250 may be an example of an "operation interface" according to aspects of the present disclosure. The storage device 215 storing the print processing program in the program storage area 232 may be an example of a "non-transitory computer-readable medium storing computer-readable instructions" according to aspects of the present disclosure.

What is claimed is:

1. A printing apparatus comprising:
a holder configured to hold an expendable supply attached thereto;
a print engine configured to perform printing using the supply;
a display configured to display information regarding the supply; and
a controller configured to:
determine whether a supply-consumed status amount of the supply attached to the holder has reached a first threshold, the supply-consumed status amount representing how much the supply is consumed;
after determining that the supply-consumed status amount of the supply attached to the holder has reached the first threshold, determine whether the printing apparatus is in a contracted mode, in which a contract for the supply used for the printing has been concluded, or in an uncontracted mode, in which the contract has not been concluded,
when determining that the printing apparatus is in the contracted mode, causing the display to show supply-related information related to the concluded contract for the supply used for the printing, and
when determining that the printing apparatus is in the uncontracted mode, causing the display to show information different from the supply-related information.

2. The printing apparatus according to claim 1, wherein the controller is further configured to:
operate according to whether the printing apparatus is in the uncontracted mode, in which the contract has not been concluded, or in the contracted mode in which the contract has been concluded; and
when determining that the supply-consumed status amount of the supply attached to the holder has reached the first threshold, perform:
when the printing apparatus is in the uncontracted mode, causing the display to show contract-conclusion guidance information to prompt conclusion of the contract; and
when the printing apparatus is in the contracted mode, causing the display to show the supply-related information.

3. The printing apparatus according to claim 2, wherein the controller is further configured to, when determining that the supply-consumed status amount has reached the first threshold, cause the display to show a warning screen including a notification that the supply-consumed status amount has reached the first threshold.

4. The printing apparatus according to claim 3, further comprising an operation interface,
wherein the controller is further configured to, based on a first operation performed on the warning screen via the operation interface, cause the display to show a supply-consumed status amount display screen to represent a remaining amount or a consumed amount of a printing agent as the supply-consumed status amount.

5. The printing apparatus according to claim 4, wherein the controller is further configured to, when the printing apparatus is in the uncontracted mode, cause the display to show the contract-conclusion guidance information, based on a second operation performed on the warning screen via the operation interface.

6. The printing apparatus according to claim 3, wherein the controller is further configured to, when the printing apparatus is in the contracted mode, cause the display to show the supply-related information on the warning screen.

7. The printing apparatus according to claim 2, wherein the supply-related information contains usage caution information on cautions to be taken in using the supply.

8. The printing apparatus according to claim 7, wherein the usage caution information contains information to prompt replacement of the supply attached to the holder when the supply-consumed status amount has reached a second threshold different from the first threshold.

9. The printing apparatus according to claim 7, wherein the usage caution information contains information to prompt using up the supply attached to the holder.

10. The printing apparatus according to claim 2, wherein the supply-related information contains shipping information regarding a shipping status of a new supply for replacement of the supply attached to the holder.

11. The printing apparatus according to claim 10, wherein the controller is further configured to, when the printing apparatus is in the contracted mode, perform:
sending an inquiry about the shipping status of the new supply, in response to determining that the supply-consumed status amount has reached the first threshold;
obtaining a reply to the inquiry about the shipping status of the new supply; and
causing the display to show the shipping information based on the obtained reply.

12. The printing apparatus according to claim 10, wherein the controller is further configured to, when the printing apparatus is in the contracted mode, perform:
accepting a shipping request operation according to the shipping information shown on the display; and
sending a shipping request for the new supply in response to the shipping request operation accepted.

13. The printing apparatus according to claim 2, wherein the controller is further configured to, when the printing apparatus is in the contracted mode, change a display mode for displaying the supply-related information on the display, depending on which, among a plurality of services based on the contract concluded, is provided to the printing apparatus.

14. The printing apparatus according to claim 2, wherein the controller is further configured to:
determine whether the printing apparatus is of a model compatible with the contract; and
when determining that the printing apparatus is of the model compatible with the contract, cause the display to:

show the contract-conclusion guidance information when the printing apparatus is in the uncontracted mode; and show the supply-related information when the printing apparatus is in the contracted mode.

15. The printing apparatus according to claim 1, wherein the controller is further configured to:
operate according to whether the printing apparatus is in the uncontracted mode, in which the contract has not been concluded, or in the contracted mode in which the contract has been concluded;
when determining that the supply-consumed status amount of the supply attached to the holder has reached the first threshold, cause the display to show a first warning screen to provide a notification that the supply-consumed status amount has reached the first threshold;
when determining that the supply-consumed status amount of the supply attached to the holder has reached a second threshold, cause the display to show a second warning screen to provide a notification that the supply-consumed status amount has reached the second threshold, the second threshold being set to indicate that the supply is more consumed when the supply-consumed status amount has reached the second threshold than when the supply-consumed status amount has reached the first threshold;
when the printing apparatus is in the uncontracted mode, cause the display to show information to prompt replacement of the supply attached to the holder on the first warning screen; and
when the printing apparatus is in the contracted mode, cause the display to show the information to prompt replacement of the supply attached to the holder on the second warning screen.

16. A print processing system comprising:
a printing apparatus; and
a server communicably connected with the printing apparatus,
wherein the printing apparatus comprises:
a holder configured to hold an expendable supply attached thereto;
a print engine configured to perform printing using the supply;
a display configured to display information regarding the supply;
a controller configured to:
determine whether a supply-consumed status amount of the supply attached to the holder has reached a first threshold, the supply-consumed status amount representing how much the supply is consumed;
after determining that the supply-consumed status amount of the supply attached to the holder has reached the first threshold, operate according to whether the printing apparatus is in an uncontracted mode, in which a contract on the supply used for the printing has not been concluded, or in a contracted mode, in which the contract has been concluded; and
when determining that the supply-consumed status amount of the supply attached to the holder has reached the first threshold, perform:
when the printing apparatus is in the uncontracted mode, causing the display to show contract-conclusion guidance information to prompt conclusion of the contract; and
when the printing apparatus is in the contracted mode, causing the display to show supply-related information related to the concluded contract, and sending to the server an inquiry about a shipping status of a new supply for replacement of the supply attached to the holder,
wherein the server is configured to send, to the printing apparatus, a reply to the inquiry about the shipping status of the new supply, and
wherein the controller of the printing apparatus is further configured to:
receive, from the server, the reply to the inquiry about the shipping status of the new supply; and
cause the display to show shipping information regarding the shipping status of the new supply based on the received reply.

17. A non-transitory computer-readable medium storing computer-readable instructions executable by a processor of a printing apparatus, the printing apparatus comprising a holder configured to hold an expendable supply attached thereto, a print engine configured to perform printing using the supply, and a display configured to display information regarding the supply, the instructions being configured to, when executed by the processor, cause the printing apparatus to:
determine whether a supply-consumed status amount of the supply attached to the holder has reached a first threshold, the supply-consumed status amount representing how much the supply is consumed;
after determining that the supply-consumed status amount of the supply attached to the holder has reached the first threshold, operate according to whether the printing apparatus is in an uncontracted mode, in which a contract on the supply used for the printing has not been concluded, or in a contracted mode, in which the contract has been concluded; and
when determining that the supply-consumed status amount of the supply attached to the holder has reached the first threshold, perform:
when the printing apparatus is in the uncontracted mode, causing the display to show contract-conclusion guidance information to prompt conclusion of the contract; and
when the printing apparatus is in the contracted mode, causing the display to show supply-related information related to the contract concluded.

* * * * *